US012632617B1

(12) United States Patent
Chinnakannan et al.

(10) Patent No.: US 12,632,617 B1
(45) Date of Patent: May 19, 2026

(54) MANAGING DIGITAL TWINS

(71) Applicant: Amazon Technologies, Inc., Seattle, WA (US)

(72) Inventors: Palani Chinnakannan, San Jose, CA (US); Arvind Karuppasamy, Issaquah, WA (US); Varadarajan Devnath, Bellevue, WA (US)

(73) Assignee: Amazon Technologies, Inc, Seattle, WA (US)

( * ) Notice: Subject to any disclaimer, the term of this patent is extended or adjusted under 35 U.S.C. 154(b) by 965 days.

(21) Appl. No.: 17/169,321

(22) Filed: Feb. 5, 2021

(51) Int. Cl.
| | |
|---|---|
| *G06F 30/20* | (2020.01) |
| *G06F 8/60* | (2018.01) |
| *G06F 113/06* | (2020.01) |

(52) U.S. Cl.
CPC ............... *G06F 30/20* (2020.01); *G06F 8/60* (2013.01); *G06F 2113/06* (2020.01)

(58) Field of Classification Search
CPC ......... G06F 30/20; G06F 8/60; G06F 2113/06
See application file for complete search history.

(56) References Cited

U.S. PATENT DOCUMENTS

| | | | |
|---|---|---|---|
| 9,995,278 B2 | 6/2018 | Lund et al. | |
| 2016/0333855 A1* | 11/2016 | Lund ................... | G05B 13/041 |
| 2017/0286572 A1 | 10/2017 | Hershey et al. | |
| 2019/0163147 A1* | 5/2019 | D'Amato ................ | G06F 17/16 |
| 2019/0176862 A1* | 6/2019 | Kumar .................... | B61L 27/40 |

| | | | |
|---|---|---|---|
| 2020/0412752 A1 | 12/2020 | Shapoury | |
| 2021/0350294 A1 | 11/2021 | Johnson | |
| 2022/0027529 A1* | 1/2022 | Zarur ............... | G05B 19/41885 |

FOREIGN PATENT DOCUMENTS

| | | |
|---|---|---|
| EP | 3663873 | 6/2020 |

OTHER PUBLICATIONS

Xiangjun Z, Ming Y, Xianglong Y, Yifan B, Chen F, Yu Z. Anomaly detection of wind turbine gearbox based on digital twin drive. In2020 IEEE 3rd Student Conference on Electrical Machines and Systems (SCEMS) Dec. 4, 2020 (pp. 184-188). IEEE. (Year: 2020).*

(Continued)

*Primary Examiner* — Eunhee Kim
(74) *Attorney, Agent, or Firm* — Robert C. Kowert; Kowert, Hood, Munyon, Rankin & Goetzel, P.C.

(57) ABSTRACT

A digital twin service of a provider network allows a user to build a digital twin to simulate behavior and changes of a physical system at a client's site. The digital twin service may receive, from the user, a definition for each model to be used to simulate each component of the physical system. For example, the user may indicate various properties of the model, behaviors of the model, and relationships between the model and one or more other models (e.g., chaining via inputs/outputs). The digital twin service may then build and deploy the models to a runtime environment. The runtime environment executes the models and receives telemetry data from the physical system. The user may modify the simulation (e.g., provide new telemetry data or modify/add new models). The simulation generates one or more results based on the modification and sends the results to a destination.

20 Claims, 13 Drawing Sheets

(56) References Cited

OTHER PUBLICATIONS

Wagg DJ, Worden K, Barthorpe RJ, Gardner P. Digital twins: state-of-the-art and future directions for modeling and simulation in engineering dynamics applications. ASCE-ASME Journal of Risk and Uncertainty in Engineering Systems, Part B: Mechanical Engineering. Sep. 1, 2020;6(3):030901. (Year: 2020).*
Rasheed A, San O, Kvamsdal T. Digital twin: Values, challenges and enablers from a modeling perspective. IEEE access. Jan. 28, 2020;8:21980-2012. (Year: 2020).*
U.S. Appl. No. 17/169,325, filed Feb. 5, 2021, Palani Chinnakannan et al.
M. Ayani, et al., "Digital Twin: Applying emulation for machine reconditioning," Elsevier, Procedia CIRP vol. 72, pp. 243-248, 2018.
U.S. Appl. No. 19/406,709, file Dec. 2, 2025, Palani Chinnakannan et al.

* cited by examiner

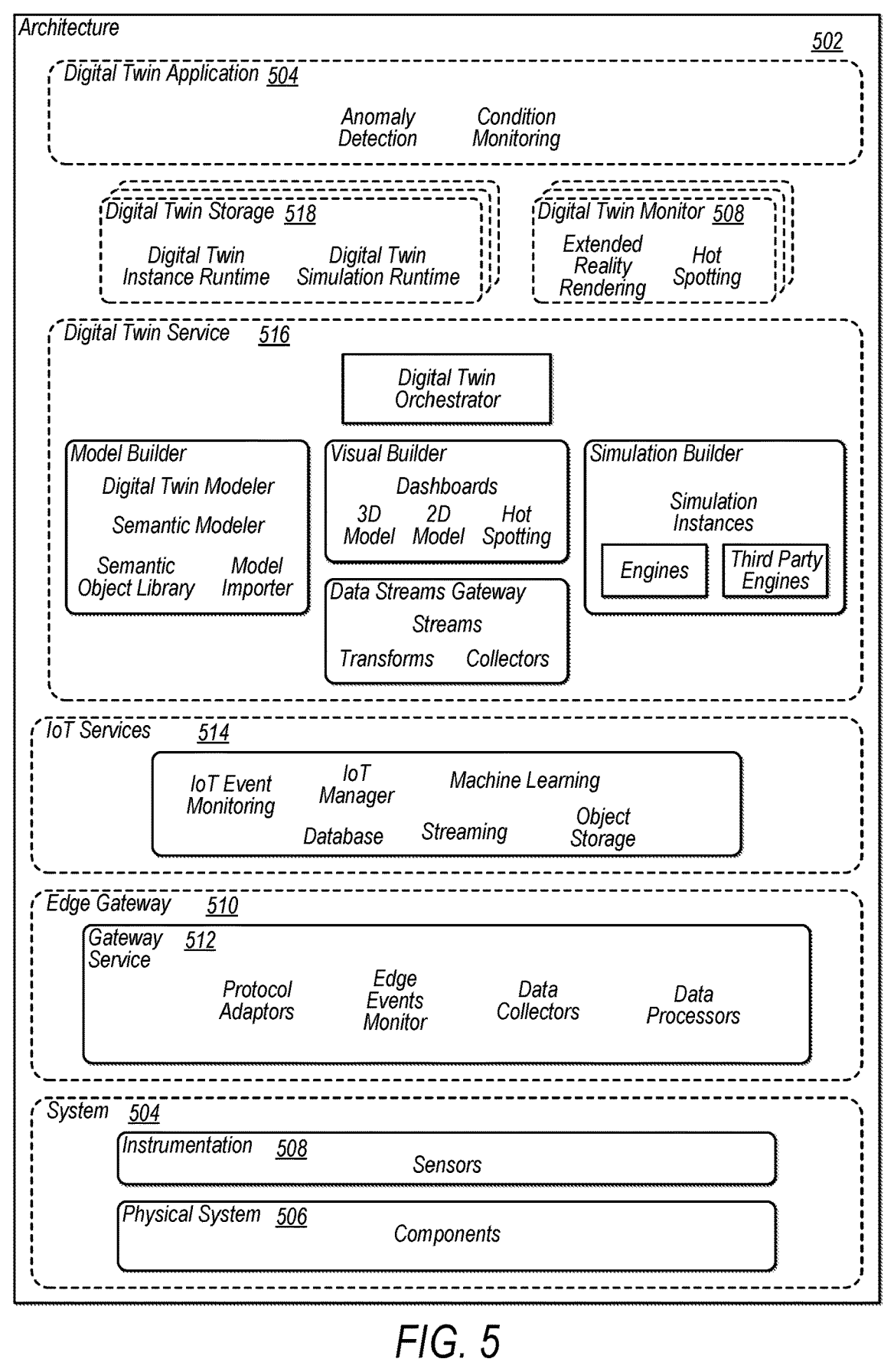

Architecture                                                                                                502

Digital Twin Application  504

Anomaly          Condition
Detection        Monitoring

Digital Twin Storage  518

Digital Twin          Digital Twin
Instance Runtime      Simulation Runtime

Digital Twin Monitor  508

Extended
Reality          Hot
Rendering        Spotting

Digital Twin Service    516

Digital Twin
Orchestrator

Model Builder

Digital Twin Modeler

Semantic Modeler

Semantic          Model
Object Library    Importer

Visual Builder

Dashboards
3D      2D      Hot
Model   Model   Spotting

Data Streams Gateway

Streams

Transforms      Collectors

Simulation Builder

Simulation
Instances

Engines        Third Party
               Engines

IoT Services    514

IoT
IoT Event        Manager        Machine Learning
Monitoring                                      Object
                 Database    Streaming          Storage Edge Gateway    510

Gateway    512
Service

Edge
Protocol         Events         Data            Data
Adaptors         Monitor        Collectors      Processors System    504

Instrumentation    508
                            Sensors

Physical System    506
                            Components

FIG. 5

Digital Twin Representation (Simulation) of a Wind Turbine

FIG. 7

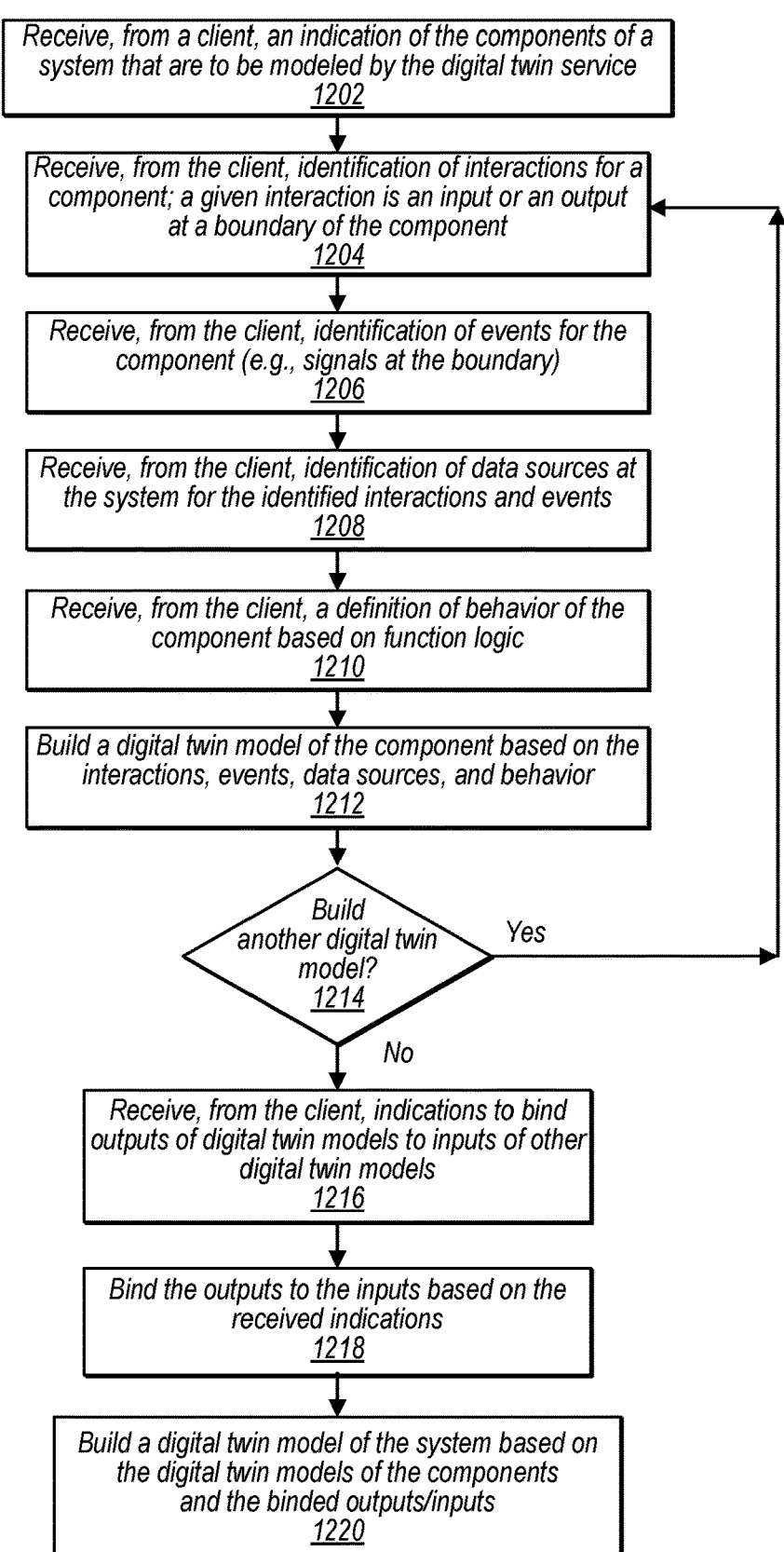

Receive, from a client, an indication of the components of a system that are to be modeled by the digital twin service
1202

Receive, from the client, identification of interactions for a component; a given interaction is an input or an output at a boundary of the component
1204

Receive, from the client, identification of events for the component (e.g., signals at the boundary)
1206

Receive, from the client, identification of data sources at the system for the identified interactions and events
1208

Receive, from the client, a definition of behavior of the component based on function logic
1210

Build a digital twin model of the component based on the interactions, events, data sources, and behavior
1212

Build another digital twin model?
1214

Yes

No

Receive, from the client, indications to bind outputs of digital twin models to inputs of other digital twin models
1216

Bind the outputs to the inputs based on the received indications
1218

Build a digital twin model of the system based on the digital twin models of the components and the binded outputs/inputs
1220

FIG. 12

MANAGING DIGITAL TWINS

BACKGROUND

A wide variety of physical systems are used across different industries in order to achieve different goals. For example, an energy company may operate a wind turbine in order to maximize the amount of power output produced by the wind turbine, depending on environmental conditions. As another example, a manufacturer of computer-related products (semiconductors, smart phones, etc.) may operate a production or assembly system in order to minimize the number of product defects during the manufacturing process.

In many cases, a representation of a physical system may be created in order for engineers or operators to more easily visualize the locations of different components of the system. For example, a 3D model of a wind turbine may allow an engineer to see the locations of different gears in a gear box. Although such a model may be helpful for engineers to refer to when building or maintaining a physical system or maintaining the physical system, the model may not be helpful for troubleshooting certain issues or discovering the effects of certain changes to the system or environment. Therefore, performing these troubleshooting activities requires making changes to the physical system or environment, which can be an extremely challenging and time-consuming process.

BRIEF DESCRIPTION OF THE DRAWINGS

FIG. 5 is a logical block diagram illustrating a high level architecture of a system for modeling, building, and managing digital twins of systems through ingestion of real time data streams into behavior simulation of system components, according to some embodiments.

FIG. 7 is a logical block diagram illustrating a simulation of a wind turbine using digital twins of different components of the wind turbine, according to some embodiments.

FIG. 12 is a high-level flowchart illustrating various methods and techniques to build high fidelity digital twin models for components and systems of components, according to some embodiments.

Figure 1:
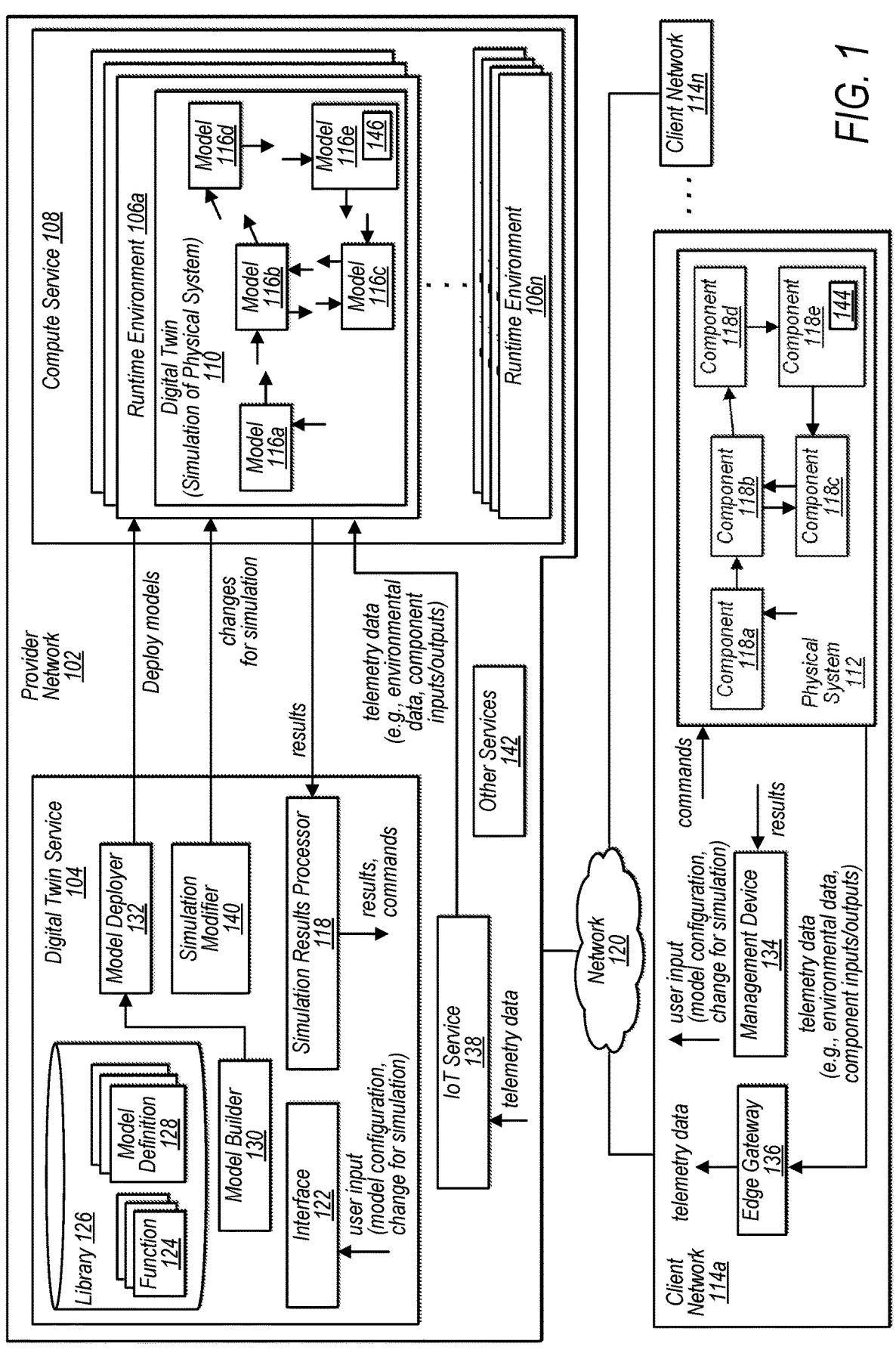
FIG. 1 is a logical block diagram illustrating a system for modeling, building, and managing digital twins of systems through ingestion of real time data streams into behavior simulation of system components, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to model, build, and manage digital twins of systems through ingestion of real time data streams into behavior simulation of system components or to build high fidelity digital twin models for components and systems of components, according to some embodiments. In embodiments, modeling, building, and managing digital twins of systems through ingestion of real time data streams into behavior simulation of system components or building high fidelity digital twin models for components and systems of components may reduce the amount of time and usage of resources to discover the effects of making changes to a physical system and may provide higher fidelity modeling, compared to other techniques. For example, one or more potential changes to a physical system can be provided to a simulation of the physical system in order to determine one or more effects of the changes, without having to make any changes to the physical system itself. Furthermore, high fidelity digital twin models of components may be built using more user-friendly techniques, resulting in faster build times and more accurate simulations.

In various embodiments, a client may model, build, and/or operate a digital twin of their system through a modeling language and a set of digital twin service functions. In embodiments, the modeling language may provide constructs for capturing the characteristics of the system, their components, relationships, interactions, and/or functions. The service may provide mechanisms to build a digital twin out of models of physical components (e.g., "digital twin models"), to ingest interactions between the components of the physical system as time series data sets (e.g., telemetry data retrieved from the physical system), to inject these time series into the components' digital twin instances (e.g., the executing models of a runtime environment), and/or to chain inputs/outputs between the digital twin instances as expressed in the model definitions in order to provide an operational digital twin of an entire physical system. In embodiments, the service may enable a client to observe the client's physical system through the digital twin, to answer "what-if" questions using the digital twin, and/or to control/configure, based on answers to the what-if questions, an optimal solution for a fleet of one or more physical systems through the digital twin.

As discussed in more detail below, a digital twin may be used in a variety of ways. In some embodiments, an executing model of a physical component may implement a filter that selects the time series data from the physical system (e.g., telemetry data) but does not simulate the behavior of the component (e.g., "digital twin follow mode"). In embodiments, the executing model of a physical component may implement a filter that selects the simulation output of the previous stage (e.g., another executing model) and executes a behavior simulation using the output of the previous stage as input (e.g., "digital twin simulation mode"). In various embodiments, an optimal solution may be selected based on running "what-if" scenario questions to determine the effects that potential changes may have on the physical system (e.g., potential changes in output/results of one or more of the components of the physical system).

In some embodiments, one or more commands may be sent to the physical system based on the results of the simulation. For example, if changing the direction that a wind turbine is facing results in more power output, then a command may be sent to the wind turbine to cause a component to move the direction the wind turbine is facing to the same direction indicated by the simulation.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 11 and described below.

This specification begins with a description of a system for building a digital twin to simulate behavior and changes of a physical system. A number of different methods and techniques to build a digital twin to simulate behavior and changes of a physical system are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for modeling, building, and managing digital twins of systems through ingestion of real time data streams into behavior simulation of system components, according to some embodiments.

As shown, a provider network 102 includes a digital twin service 104 that implements building a digital twin that can be used to simulate behavior and changes of a physical system. In the example embodiment, the provider network includes a runtime environment 106a of a compute service 108 that initiates/implements a digital twin 110 of a physical system (e.g., simulation of the physical system 112 at the client network/site 114a) by instantiating and/or executing models 116a-116e that are built by the digital twin service 104. As discussed below, the digital twin 110 may be a particular digital twin instance of multiple different digital twin instances of the same physical system. As shown, the compute service 108 may include any number of runtime environments 106, each executing a digital twin instance(s) of a different physical system (of the same client or a different client).

Each of the executing models 116 and/or the runtime environment 106a may simulate the behavior of a corresponding physical component 118 of the physical system 112, which may include simulating any internal behavior of the component and/or any number of interactions (inputs and/or outputs) between the component and any number of other components that may be processed by the component or other components. For example, model 116a simulates the behavior of component 118a, receives an input to the component (e.g., environmental data such as wind speed), and provides an output of component 118a that affects component 118b (e.g., rpm of a blade assembly due to wind speed). Since the definition for each model may include any inputs and/or outputs that correspond to the physical component (e.g., time-variant properties of the component of the physical system), each of the models 116 shows arrows that represent inputs and/or outputs defined for the model.

As shown, model 116b simulates the behavior of component 118b, receives an input from component 118a, receives an input from and provides an output to component 118c, and provides an output to component 118d. Model 116c simulates behavior of component 118c and provides an output to component 118b. Model 116d simulates the behavior of component 118d, receives an input from component 118b, and provides an output to component 118e. Model 116e simulates the behavior of component 118e and receives an input from component 118d.

In the depicted embodiment, the compute service 108 is offered as a separate service of the client network 102. In some embodiments, the digital twin service 104 may include the compute service 108 and/or the runtime environment 106. Therefore, in embodiments, the digital twin service 104 itself may execute the models. Similarly, in some embodiments, the digital twin service 104 may include any of the other services and/or functions of the provider network described herein. Furthermore, any number of clients of the digital twin service 104 may use the digital twin service 104 by communicating with the provider network 102 from a remote network 114 of the corresponding client (e.g., via a wide area network 120, such as the internet).

The digital twin service 104 includes an interface 122 (e.g., application programming interface (API)) that may receive user input from a management device of a remote client network (e.g., via a graphical user interface or command line interface of a display device). In the example embodiment, the interface 122 receives user input from the management device 134 of the client network 114a of a client.

In embodiments, the user input may indicate a definition of a model of a component 118 of the physical system 112 ("model definition" or "digital twin model" definition). The definition may indicate one or more time-invariant properties of the component of the physical system (e.g., a physical property that does not vary over time, such as shape or size of the component, a particular model and/or manufacturer of the component, etc.), one or more time-variant properties of the component of the physical system (e.g., temperature, rpm, input, output), a behavior simulation to be applied for the model (e.g., one or more behavior functions 124 of a library 126 to be executed to simulate behavior of the component 118), and/or one or more relationships between the model and one or more other models of other components of the physical system 112 (e.g., any number of inputs from or outputs to other models).

In various embodiments, a function (or other software component(s) that simulate behavior of a physical component) may be defined as a "black box" implementation of a model of a physical component. For example, the function may accept one or more input streams and may provide one or more output streams according to a predefined schema. Therefore, a client may have no knowledge or little knowledge of how the behavior of a physical component is simulated. In some embodiments, the client may provide some or all of the details of how the physical component is simulated. For example, the client may provide function code that defines the behavior simulation to be applied for the model (e.g., the function code processes one or more input streams and provides one or more output streams based on the processing).

In some embodiments, to indicate the definition of a model of a component 118 of the physical system 112, the user may select a pre-defined model definition 128 (e.g., a model template) and customize or extend the model by providing additional input. For example, the user may indicate a model definition for a blade assembly of a wind turbine (such as the turbine of FIG. 6 or 7) that already includes "number of blades" as a time-invariant property and "direction" as another time-invariant property of the model (if the turbine direction is not changeable). The model definition for the blade assembly may also include "torque" and "rpm" as time-variant properties of the model.

The user may then indicate one of the functions 124 as the behavior simulation to be applied for the model and a relationship between the model and another model of a gear box of the wind turbine. For example, the user may indicate that the model of the blade assembly connects to the model of a particular gear box. In embodiments, the user may provide any level of detail/fidelity to describe the relationship. For example, the user may specify a particular configuration of the connection if there are multiple ways to configure the connection. If the user does not specify the configuration, then the model builder 130 of the digital twin service 104 may assign a default configuration. The model builder 130 may assign a default value for any other number of relationships between the model and the other model that are specified by the user.

After the user indicates a definition of the model by defining the model and/or selecting one of the model definitions (with or without customizing the model definition), the user may request that the model be built and/or deployed. The model builder 130 may then build the model based on the model definition and/or send the defined model to the model deployer 132 for deployment. The user may perform any of the above steps to cause any number of models to be built that correspond to components of a physical system. For example, the user may indicate definitions for the components 118a-118e and the model builder may build each of the models based on the model definitions for each component and/or send the defined models to the model deployer 132 for deployment.

After the models and/or model definitions are built and/or sent to the model deployer, the model deployer 132 may deploy the models to the runtime environment 106a. The runtime environment may initiate the simulation of the physical system at least by executing the models 116a-116e. During execution, the runtime environment and/or the models may receive telemetry data that is based on data collected from the physical system (e.g., collected from sensors and/or other data sources at different times/over a period of time). The telemetry data may include a series of values for the one or more time-variant properties of a model.

As an example, each of the models 116 may receive temperature data of the environment of the physical system on a periodic basis (e.g., once a minute, originating from sensor(s) mounted on or near the physical system). As another example, the model 116a may be a model of a blade assembly of a wind turbine and may receive the wind speed and/or the rpm (revolutions per minute) value every 10 seconds. In various embodiments, the telemetry data may be any type of data collected from sensors and/or any other data sources of the physical system or environment of the physical system at different times (e.g., data that is streamed over time).

As depicted, an edge gateway 136 may receive the telemetry data (e.g., in a raw form from the sensors and/or other data sources). The edge gateway 136 may be include software executing on one or more computing devices that sends the telemetry data to the IoT service 138 and/or to the digital twin service 104 (after processing and/or transforming the raw data to a different format, if necessary). In embodiments, at least some of the edge gateway software is provided by the provider network and/or deployed from the provider network to the one or more computing devices of the client network for installation.

As shown, the IoT service 138 receives the telemetry data from the edge gateway 136 and sends the telemetry data to the digital twin 110 and/or any number of the models 116 (after processing and/or transforming the telemetry data to a different format, if necessary). The runtime environment and/or any number of the executing models may process the telemetry data. For example, a wind speed detector may detect an increase of wind speed from 10 mph to 20 mph. A model of the blade assembly (e.g., model 116a) may receive the new wind speed data indicating 20 mph.

In embodiments, the model 116a of the blade assembly may process the new telemetry data (e.g., wind speed data and/or temperature data) and generate output data that indicates an increased rpm. Based on the behavior simulation for the model 116a (e.g., executing a behavior simulation function(s)), the model 116a may process some or all of the telemetry data to generate an output (e.g., rpm data and/or torque data). Note that in embodiments, the behavior of the model (e.g., processing of the input data and/or generation of output data) is sufficient such that the component of the physical system, if substituted with the executing model, would enable the physical system to continue operation (causing negligible or no change to the behavior of the physical system). In embodiments, this may be the case if the component of the physical system processes input data/signals and/or generates output data/signals (a software function/module, a microchip, circuitry, etc.).

Based on the relationship (provided by the user for the model definition) between the model 116a and the model 116b, the model 116a may send the generated output (e.g., rpm data and/or torque data) to the model 116b of a gear box of the wind turbine. Based on the behavior simulation for the model 116b (provided by the user for the model definition) the model 116b may process the output of the model 116a to generate another output for the gear box (e.g., rpm). In a similar way, the output from model 116b may be sent to model 116c of a generator, which processes the output (e.g., rpm) to generate another output/result (e.g., power).

Any given model may perform any number of interactions between itself and any number of other models based on corresponding relationships defined for the model (e.g., inputs and/or outputs) and based on the processing of the data by the model. As mentioned above, the model of the blade assembly may output the data that indicates an increased rpm, and the data may be received as input to a model of a gear box of the wind turbine. The gear box, in turn, may process the data indicating the increased rpm to generate its own output data that indicates increased rpm of a gear of the gear box. By processing telemetry data from the physical system as described above (e.g., environmental data such as wind speed, temperature, etc.), the simulation may provide a real-time or near-real time representation of the physical system (e.g., a digital twin representation of a wind turbine that causes the models to behave in the same or similar way as the corresponding physical components).

During the execution of the models of the simulation of the physical system, a user may provide input (e.g., via the management device 134 and the interface 122) that indicates one or more changes to the simulation. The simulation modifier 140 may send the change(s) and/or the indication of the change(s) to the runtime environment. The runtime environment may modify the simulation to implement the indicated change(s) (e.g., forward the telemetry data to the appropriate models executing in the runtime environment and/or make changes to the models themselves) The runtime environment/model(s) may generate one or more results based on the modification(s) to the simulation.

For example, the change may be a much higher wind speed than runtime environment is currently receiving as telemetry data. The runtime environment may generate one or more results based on the modification to the simulation. For example, a wind speed of 40 mph may be provided based on user input. A model of the blade assembly may receive the new wind speed indicating 40 mph. The model of the blade assembly may process the new wind speed (e.g., based on the behavior simulation for the model) and generate output data that indicates an increased rpm of the blade assembly. The new rpm may result in a new value for the power output of the generator. The runtime environment may send the new value for the power output (and/or the increased rpm and/or any other results of the change(s)) to one or more destinations (e.g., to the management device 134 and/or to the digital twin service or other destination within the provider network).

As shown, the runtime environment may send the one or more results to a simulation results processor. The simulation results processor may forward the results to a destination so that a user or administrator can see the results of the change (e.g., send the new value of the power output to the management device 134 and/or to the digital twin service or other destination within the provider network).

In some embodiments, the simulation results processor may generate one or more commands. For example, a change to the simulation may be reducing the braking pressure of a brake system applied to a gear of the gearbox by a particular amount. The result may be an increased rpm of the gear box. If the increased rpm remains below a threshold level, then the simulation results processor may generate a command for the brake system to reduce the braking pressure by that particular amount. This may extend the life of the brake system, while operating the gear box below a maximum rpm limit.

Therefore, in various embodiments, the simulation results processor may analyze a result and based on the analysis, generate one or more commands that are configured to cause one or more components of the physical system to perform an action. The simulation results processor may then send the one or more commands to the one or more components of the physical system that cause the components to perform the action. As discussed above, the analyzing of a result may include determining that the value of the result is above or below a predetermined threshold value (e.g., exceeds a predetermined threshold value).

Figure 3:
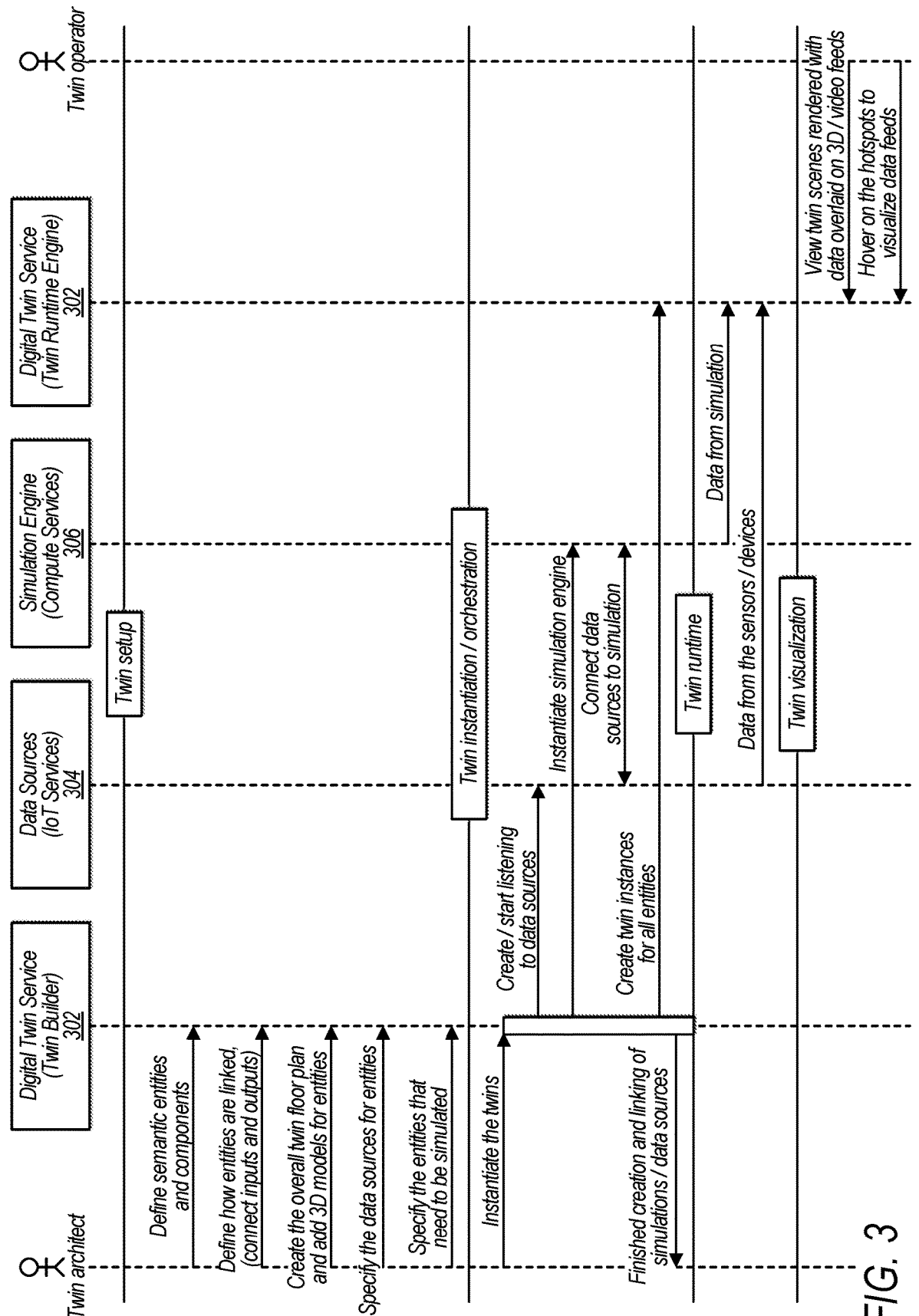
FIG. 3 is an illustration of a process for modeling, building, and managing digital twins of systems through ingestion of real time data streams into behavior simulation of system components, according to some embodiments.
Figure 4:
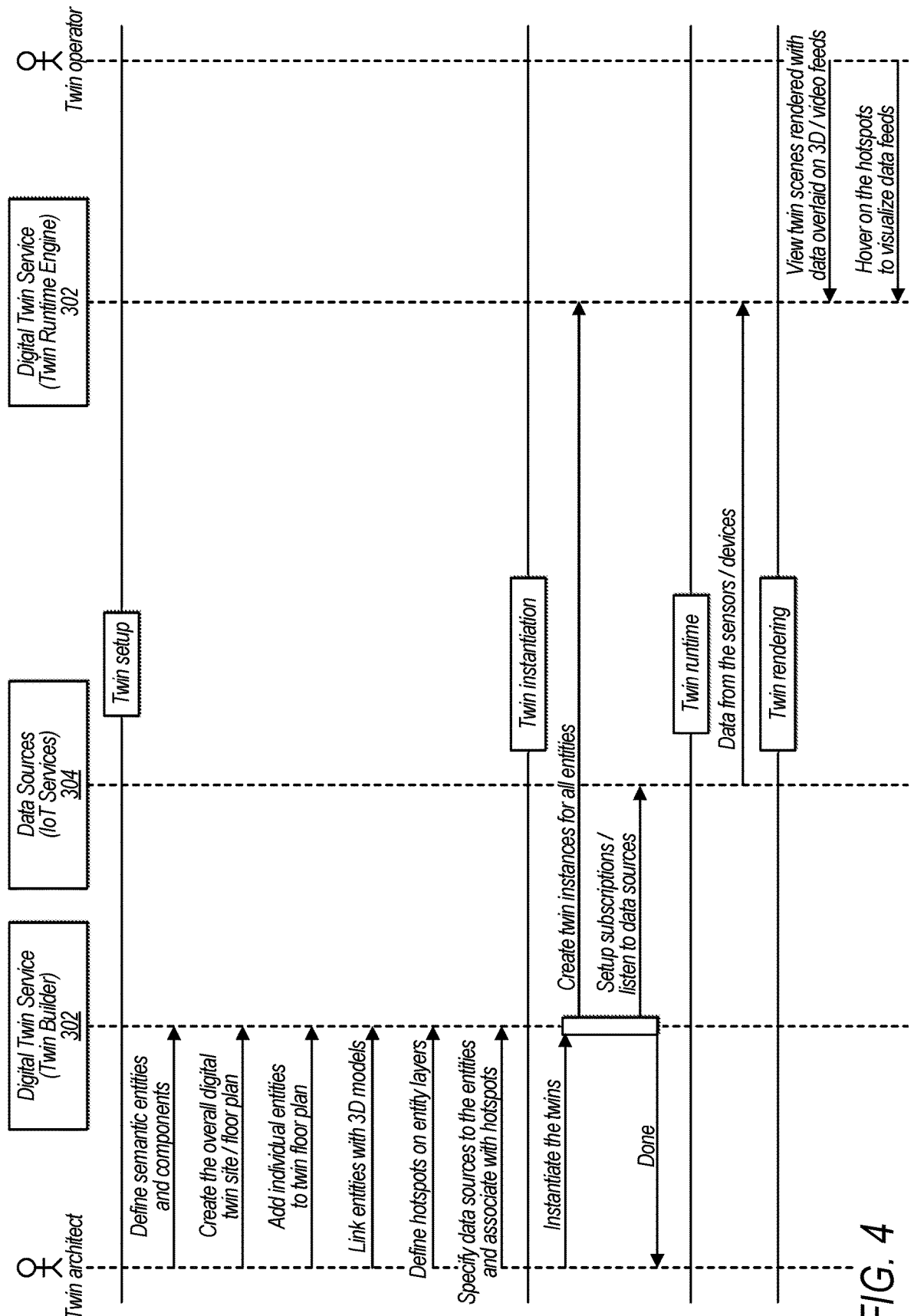
FIG. 4 is an illustration of a process for modeling, building, and managing digital twins of systems through ingestion of real time data streams into behavior simulation of system components, according to some embodiments.

As shown in FIGS. 3 and 4, in some embodiments, the initiating/performing of the simulation may include generating a 2D or 3D visualization of the physical system based on definitions of the models that are executed. The runtime environment may send the visualization to the remote network of the client (e.g., to a display of the management device). In some embodiments, some or all of the telemetry data received by the simulation is overlaid onto the visualization. For example, rpm values may be overlaid onto and/or near a visualization of the blade assembly. In embodiments, the values may not appear unless a cursor is moved over or near the visualization of the blade assembly (e.g., a "hotspot").

As described above, a user may provide additional telemetry data as the change to be applied to a particular model. To modify the simulation, the model processes the additional telemetry data to generate at least one result (e.g., increased rpm). In some embodiments, a model processes the additional telemetry data to generate an output. The model sends the output to another model (e.g., based on the relationships of the model definitions). The other model then processes the output to generate the result (e.g., increased power output).

In some embodiments, the change indicated by the user may be a new model to be added to the simulation. For example, a new gear may be added to the gear box. The runtime environment may receive additional telemetry data (e.g., updated value for rpm of the blade assembly). The gear box and/or the new gear may process the additional telemetry data to generate a result (e.g., an rpm of the new gear/gearbox). The result may be provided to a destination.

In embodiments, the change indicated by the user may be replacing a model of the simulation with a new model. For example, the model of the gear box may be terminated and a new model of the gear box may be executed to replace it. The runtime environment may receive additional telemetry data (e.g., updated value for rpm of the blade assembly). The new model of the gear box may process the additional telemetry data to generate a result (e.g., an rpm of the new gear box). The result may be provided to a destination.

In various embodiments, any combination of one or more changes may be made to the simulation and/or any of the models of the simulation based on user input that indicates the changes (e.g., providing new telemetry data, adding one or more models, removing one or more models, and/or modifying one or more aspects defined for the one or more models). For example, modifying one or more aspects defined for a model may include replacing/removing/adding one or more time-invariant properties, one or more time-variant properties, one or more behavior simulations to be applied for the model (e.g., one or more behavior functions), and/or one or more relationships between the model and one or more other models.

As described herein, the digital twin service and/or the runtime environment may modify the simulation based on the one or more changes. The simulation and/or one or more of the models may process the one or more changes to generate one or more results. The one or more results may then be sent to one or more destinations for processing. In embodiments, any number of other services 142 may be implemented by the provider network to perform any of the functions/services described herein.

Physical components may contain any number of child components. For example, a gear box may contain 10 gears. Therefore, a model may have a hierarchical relationship with other model(s). A model for the gear box may contain 10 child models—one for each gear of the physical system. Similarly, each gear may include a number of different child models for each gear tooth. In embodiments, any number of levels of models may exist, depending on how components of a physical system are modeled. In the depicted example, the physical component 118e has a child component 114. Therefore, the corresponding model 116e has a child model 146. In embodiments, a child modes may have any number of inputs and/or outputs between itself and its parent model and/or other models.

As shown, in FIG. 1, the digital twin 110 may be a particular digital twin instance of multiple different digital twin instances of the same physical system 112 that are run in respective runtime environments. In embodiments, the different instances may be used for different purposes. For example, the instance shown may be used in a simulation mode in order to answer what-if questions (as described herein). Another instance may be used to answer the same what-if question, but using one or more different behavior simulations for one or more of the components (e.g., to simulate a different type of component or to perform a higher fidelity simulation for a component). Another instance may also be used in simulation mode to answer a different what-if question (e.g., adjusting a different environmental value or affecting a different physical component). Yet another instance may be used in "follow mode," in which telemetry data for the physical system may be provided to the user, but the components do not simulate behavior. In embodiments, any number of instances may be running in the runtime environment for any number of purposes, including any of those described herein.

As mentioned above, an optimal/desired configuration for a physical system may be selected based on running "what-if" scenarios to determine the effects that potential changes may have on the physical system (e.g., potential changes in output/results of one or more of the components of the physical system). For example, a manufacturer may run different versions of a digital twin, each time changing values for one or more telemetry data inputs into one or more models of a digital twin (e.g., voltage settings, temperature, amount of usage of one or more components). The digital twin service and/or a user may select one of the digital twin versions that meets one or more performance criteria (e.g., longest lasting battery life for the physical system, most efficient battery use by the physical system). The digital twin service and/or the user may send a configuration command to any number of physical systems, which causes the physical systems to be configured according to the telemetry data that was used for the selected version of the digital twin.

In embodiments, a digital twin of a physical system may be defined as a high fidelity digital representation of the physical system that may be used, over any period of time, 1) to observe and study the physical system, 2) to determine the behavior of the physical system upon system configuration changes through user triggers, 3) to predict the response of the physical system when the physical system's input actions and events changes, and/or 4) to perform a variety of what-if scenario experiments that would be expensive or impossible to perform on the physical system.

A digital twin of a physical system may implemented in a variety of use cases. In some embodiments, for an "observability" use case, the digital twin of the physical system enables a user to visualize and manage physical system assets with an enhanced look and feel compared to the real physical system. This use case may overlay ingested raw asset data (from upstream sources) onto a 3D static visual rendering of the physical system. The system may add necessary digital dashboards, meters and displays that may not exist in the physical system. In some embodiments, this use case may be referred to as a "non-real time" use case. In embodiments, an "advanced observability" use case may enhance the above use case and enables a user to observe the physical system rendering along with contextualized information, location specific information, and/or processed information from other the IoT service and/or other services of the provider network (e.g., data received from the client network and formatted/transformed/etc.). This use case may use real time 3D model rendering and augmented reality/extended reality (AR/XR) technologies as desired/specified.

In embodiments, a "system behavioral" use case may enable a user to answer any number of what-if questions through different types (physics, machine learning/AI, trans-forms/metrics) of simulations of physical system components applied on the digital twins (models) of the system components (e.g., by using one or more behavior functions). In some embodiments, this use case may be referred to as a "real time/non-real time" use case. In some embodiments, a "controllability" use case may enable a user to operate and manipulate the physical system through the digital twins. In some embodiments, this use case may be referred to as another type of "real time" use case.

In some embodiments, there are certain characteristics of the physical system and criteria (e.g., requirements) for representing a corresponding digital twin of the system. These characteristics and representation criteria provide the functional criteria and features for the system/software system that enables the use of digital twins. In embodiments, the characteristics and/or representation criteria may include 1) digital twins represent a physical system in the digital space; 2) the digital representation may require identification and mapping of A) different components along with their relationships that make up the physical system B) the input/output stimulus and events at the boundaries of the physical system C) the interactions between the components of the physical system identified, and D) the configuration triggers applied to the physical system; 3) a digital twin may require visualization of each component that makes the physical system identified above (e.g., spatial and time co-ordinates for rendering these components); 4) a digital twin may require digital representation of each component of the physical system with high-fidelity that enables the substitution of the physical system with the digital twin for any/all use cases (a high-fidelity digital twin of a physical system may require high-fidelity for only a subset of components present in the physical system, while one or more of the rest of the components may be represented with lower and different grades of fidelity; a different use case may require different degrees of fidelity between/for the components that make up the physical system); 5) a digital twin may depict a set of non-physical and/or non-tangible properties of the physical system as an overlay, in addition to normal properties—in embodiments, the digital twin may require the use of external systems and services for computing such properties using measurements ingested from the physical system; and/or 6) digital twin end users may desire the same semantic characteristics in a digital twin as that of the physical system, irrespective of the use case.

In embodiments, a digital twin of a physical system and/or a model may be used across a variety of industries and for many different use cases. For example, a digital twin for a wind turbine may simulate components that include environment, turbine assembly, braking system, gear box, and/or generator. A digital twin for a building may simulate components that include environment, floors, elevators, HVAC, parking slots, people, electrical, and/or plumbing (use cases may include construction management, facility management, green building, etc.). A digital twin for construction may simulate components that include environment, excavators, dozers, trenchers, loaders, material shed, tools shed, and/or people (use cases may include construction site management, safety planning, equipment and tool usage optimization, equipment failure prediction, inventory planning, etc.). A digital twin for an industrial floor may simulate components that include CNC machines, conveyors, articulated robots, AGV, materials, people, and/or MES/SCADA/ERP systems (use cases may include production planning, anomaly detection, predictive maintenance, etc.). A digital twin for hospital management may simulate components that include patients, staff, nurses, doctors, wards, surgeries, pharmacy, laboratories, radiology, patient equipment, supplies, software systems, and/or security (use cases may include hospital workflow simulation, emergency capacity and staff simulation, personalized care models, ward management, etc.).

Figure 2:
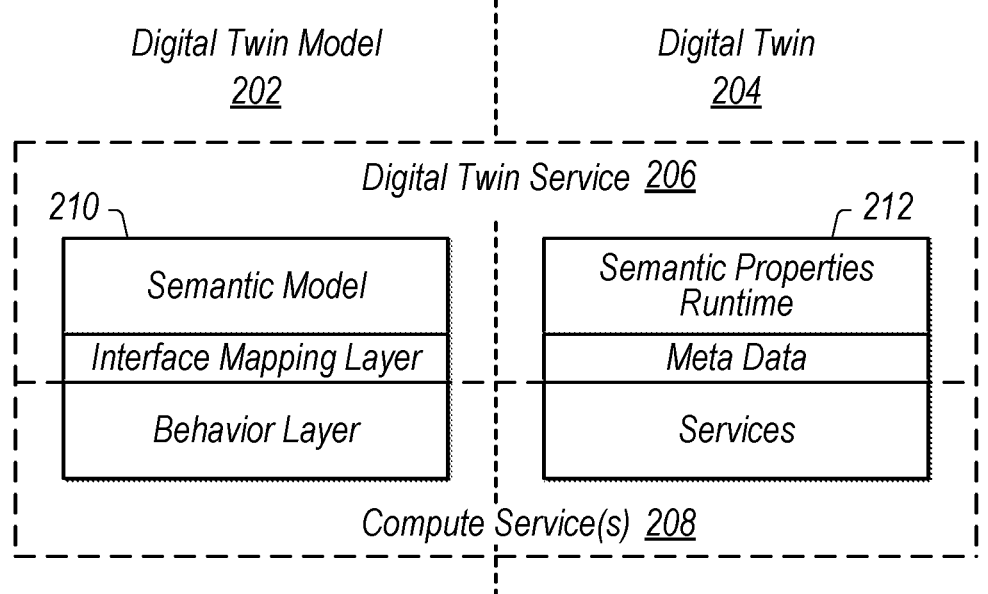
FIG. 2 is a logical block diagram illustrating a digital twin model and the corresponding digital twin, according to some embodiments.

FIG. 2 is a logical block diagram illustrating a digital twin model and the corresponding digital twin, according to some embodiments.

In embodiments, one or more different users (digital twin architects, designers, developers, etc.) may build digital twin models 202 and the associated digital twin 204. In the example embodiment, a digital twin service 206 (e.g., service 104 of FIG. 1) may implement a top layer of the digital twin model 202 and the associated digital twin 204, whereas one or more compute services 208 (e.g., compute service 108 of FIG. 1) may implement a bottom layer of the digital twin model 202 and the associated digital twin 204.

As shown, the digital twin model may include a top semantic model layer 210 which provides a set of re-usable semantic models of physical world components. A bottom behavior layer provides different types of pluggable component services that could range from physics simulation to ML models and AI models (e.g., implemented as behavior functions). Actions, events and/or triggers are the inputs to the behavior layer. The behavior layer responds to these inputs through algorithms and computations by altering its states and generating outputs. In embodiments, the semantic properties runtime 212 represents the execution of the semantic model in a runtime environment. The services may include compute services and/or any other services that may implement the behavior layer (e.g., by executing one or more functions).

A middle interface mapping layer is a meta data model that binds the semantic properties in the top layer to one or more of 1) the input and output data streams representing the interactions at the boundaries of the physical system 2) the data streams representing the interactions between the components of the system, 3) the data stream associated with that semantic property, 4) the configuration triggers in the physical system, and/or 5) the computation results from the services in the bottom layer. The mapping layer may also provide the preferred binding (hot spots) for the visualization overlays of data on to the visual rendering of the digital twin. In embodiments, the mapping layer may also enable use of different component behavior models (e.g., through using behavior functions) based on fidelity requirements of the use cases.

In embodiments, a language, tools, and various techniques may simplify the model building process. For example, a service may allow for auto-generation of models, model re-use, model extraction/import from other locations, etc. In embodiments, a model may be extensible from a general model to a specific model to meet the nuances in each physical world component. The model may express relationship between the components that make up the physical system as a) an associative relationship between loosely connected components to aid navigation; b) an aggregation relationship between components that depicts a sub-ordinate relationship; and/or c) a composition relationship between components that exhibit a whole-and-part relationship (e.g., the life cycle of part depends on the life cycle of whole). The service may enable sharing of models through a common repository of models (e.g., library, semantic model library) and/or model sharing between users of the digital twin service (e.g., through publishing to a third party model library).

There may be various advantages of a layered modeling technique. For example, a semantic top level model layer may enable a user to 1) create a single model inheritance hierarchy for a component type and re-use this semantic model in most use cases, 2) maintain the consistency of the digital representation of a component across different use cases, 3) model the required top-level components with ease through embedding the readily available models for the sub components that make up the top-level, and/or 4) maintain the consistency of the physical system semantics in the digital representation.

In various embodiments, the same user or different users may define/build various aspects of a digital twin model using one or more different interfaces provided by the digital twin service. For example, a digital twin designer may build an initial digital twin model of a physical system by placing all the component models in a digital twin "builder board" and coupling them together using a digital twin builder. In embodiments, the coupling act may include 1) identifying data sets and associated transformation and/or computations required for each property, 2) matching and binding the output interactions and events of one component model with the inputs of the connected component, 3) determining the IoT services used for data ingestion and transformation, and/or 4) determining how to realize the different types of simulations and algorithms required for each component using IT services and/or compute services. In embodiments, the designer may validate the constructed model and save it to the library for later use and sharing with other users.

In some embodiments, a visual designer may define the overall visual experience, dashboards, charts and plots, heat and color maps etc., for the digital twin and its applications. The visual designer may edit the models created by the designer by placing the different models of a physical system into a digital twin "builder" and 1) bind each model of the digital twin of the physical system rendering and visualization flow either holistically or at individual component level, 2) identify points of interest (hot spots) on the models, 3) identify data sets (e.g., telemetry data) and associated transformation and/or computations required for generating different visual overlays like heat maps, plots and charts, and/or 4) identify rendering methodology for the data set and associating them with the hot spots.

FIG. 3 is an illustration of a process for modeling, building, and managing digital twins of systems through ingestion of real time data streams into behavior simulation of system components, according to some embodiments.

As shown, a user ("twin architect") sets up a digital twin (e.g., indicates definitions of the models of the physical components) and causes the digital twins to be instantiated (e.g., implementing the simulation of the physical system). Another user ("twin operator") may then view the twin scenes, input changes to the simulation and observe one or more results, and/or perform any other number of actions associated with the simulation.

In embodiments, the digital twin service 302 may provide the same or similar functionality/services as the digital twin service 104 of FIG. 1. In various embodiments, some or all of the digital twin service 302, the data sources 304, and/or the simulation engine 306 may be implemented by the digital twin service 104 and/or one or more other services of the provider network 102.

In the depicted embodiment, the twin architect uses the digital twin service (e.g., a twin builder) to define semantic entities and models/components. The architect also defines how entities are linked (e.g., connecting/defining inputs and outputs between different models). The architect also creates the overall twin floor plan and adds 3D models for entities (e.g., for each of the defined models). The architect also specifies the data sources for the entities (e.g., specify/configure the sources for telemetry data that is sent to each model). The architect also specifies the entities that need to be simulated. In some cases, not every model may need to have a behavior simulation defined for it. Instead, the model may be used for visualization and/or to display/overlay telemetry data.

The architect may then cause the digital twins to be instantiated (e.g., built via a user request/input). In the example embodiment, an IoT service may begin listening and receiving data from data sources (e.g., sensors of the physical system). As shown, a simulation engine may be instantiated to simulate the behavior of the components of the physical system (e.g., as a runtime environment of a compute service). The data sources may be connected to the simulation engine via the IoT service. Digital twin instances may be rendered to create a digital twin scene representing the physical system (e.g., as graphical representations of each physical component). The twin builder may send a notification to the architect to indicate the digital twin scene is available for viewing.

As depicted, during execution of the models in the runtime environment, data from the simulation (e.g., model outputs) is sent to the digital twin scene and data from the data sources (e.g., from sensors/devices sent via the IoT service) is sent to the digital twin scene. The twin operator may then view the digital twin scene rendered with data (e.g., telemetry data and/or model outputs) overlaid on the graphical representations of the components. In embodiments, the digital twin scene may include images from a live video feed of the physical system. In some embodiments, the twin operator may hover a cursor over defined hotspots for each physical component to visualize data feeds (e.g., telemetry data and/or model outputs).

In some embodiments, the physical system may not have all of the desired sensors and/or other physical components, so those sensors and/or other physical components may be created/simulated as virtual sensors and/or components of the digital twin of the physical system. In embodiments, the user may modify the physical simulation by swapping out an executing model with a different model and observe any effects/results of the modification.

FIG. 4 is an illustration of a process for modeling, building, and managing digital twins of systems through ingestion of real time data streams into behavior simulation of system components, according to some embodiments.

Similar to FIG. 3, a user ("twin architect") sets up a digital twin (e.g., indicates definitions of the models of the physical components) and causes the digital twins to be instantiated. However, in the depicted example, the behavior of the components is not simulated. Therefore, the simulation engine is not used. Another user ("twin operator") may then view the twin scenes, which may include telemetry data.

In embodiments, the digital twin service 302 may provide the same or similar functionality/services as the digital twin service 104 of FIG. 1. In various embodiments, some or all of the digital twin service 302 and the data sources 304 may be implemented by the digital twin service 104 and/or one or more other services of the provider network 102.

In the depicted embodiment, the twin architect uses the digital twin service (e.g., a twin builder) to define semantic entities and models/components. The architect also creates the overall floor plan, adds entities (models) to the floor plan, and links the entities with 3D models. The architect defines hotspots for the entity layers. The architect also specifies the data sources for the entities (e.g., specify/configure the sources for telemetry data that is sent to each model). The architect specifies data sources to the entities (e.g., the sensors and/or devices of the physical system) and associates the data sources with the hotspots.

The architect may then cause the digital twins to be instantiated (e.g., built via a user request/input). An IoT service may begin listening and receiving data from data sources (e.g., sensors of the physical system). Digital twin instances may be rendered to create a digital twin scene representing the physical system (e.g., as graphical representations of each physical component). The twin builder may send a notification to the architect to indicate the digital twin scene is available for viewing.

As depicted, data from the data sources (e.g., from sensors/devices sent via the IoT service) is sent to the digital twin scene. The twin operator may then view the digital twin scene rendered with data (e.g., telemetry data and/or model outputs) overlaid on the graphical representations of the components. In embodiments, the digital twin scene may include images from a live video feed of the physical system. In some embodiments, the twin operator may hover a cursor over defined hotspots for each physical component to visualize data feeds (e.g., telemetry data and/or model outputs).

In the example embodiment, the digital twin service may be used to model the relationship between different components, identify the right telemetry to track from each component, and link those models to the actual data sources and 3D models. The user may define the semantic entities (e.g., time-variant properties for telemetry data, relationships) in the digital twin service and associate the 3D/AR models for the components. In embodiments, the user may instantiate the digital twins by connecting the data sources to the digital twin models. The twin service collects data from the data sources and overlays the data with the 3D/AR/VR models to provide a graphical view of the twins in real time. In this use case, the twin service is not involved in connecting the individual twin components together. The components are already connected in the physical system and the twins are used for observing the telemetry from the components.

Therefore, inputs and outputs between the components may not need to be modeled in this example embodiment.

FIG. 5 is a logical block diagram illustrating a high level architecture of a system for modeling, building, and managing digital twins of systems through ingestion of real time data streams into behavior simulation of system components, according to some embodiments.

In the example embodiment, the architecture 502 of a system for building a digital twin to simulate behavior and changes of a physical system includes a system 504 at the client's remote site. The system includes the physical system 506 to be simulated (e.g., components) and instrumentation 508 (e.g., sensors and/or other data sources). In some embodiments, the physical system includes the instrumentation as well. Therefore, the components that make up the instrumentation are to be simulated as well.

The architecture also includes an edge gateway 510 at the client's remote site. The edge gateway implements a gateway service 512. The gateway service may include any functionality that is needed to collect/process data from the physical system and/or instrumentation and to send the data on to one or more destinations of the provider network (e.g., IoT services 514). For example, protocol adapters may enable communication with components of the system/physical system, the edge events monitor may detect various events that occur at components in the system, and the data collectors may collect data and send the data to the data processors, which in turn send the processed data on to the provider network.

The IoT services 514 are implemented at the provider network. The IoT services 514 may include any functionality that is needed to collect/process data from the edge gateway (e.g., data from the system 504) and to send the data on to one or more destinations of the provider network (e.g., the digital twin service 516 or the digital twin simulation runtime/executing models). For example, the IoT services may include an IoT event monitoring service, an IoT manager service to manage various components of the client site/network, a machine learning service to analyze and update machine learning models based on data from the client site, and a streaming service that may receive streaming data from the client system and forward the data to a database, object storage, and/or to the digital twin service.

The digital twin service 516 includes a model builder that may build a model after receiving an indication of a model definition from a user. The model builder may have a digital twin modeler and semantic modeler to receive model definitions from a user, a semantic object library for a user to select pre-defined models, and a model importer to import pre-defined models from another location in or external to the provider network. The visual builder may allow for a user to use dashboards to provide information to construct a 3D or 2D model of a physical component/system, as well as indicate various hotspots. The simulation builder may use engines or third party engines to build/implement simulation instances. The data streams gateway may include collectors to receive data streams and process or apply transforms to the streams before sending them on to a simulation of a physical system/models. The digital twin orchestrator may coordinate the building of models, routing of streams to simulations/executing models, and perform various other functions to handle the configuration and launching of simulations and models.

The architecture may also include digital twin storage 516, which may be memory that stores a digital twin instance runtime and/or a digital twin simulation runtime during execution of the digital twin. As shown, any number of digital twin instances or digital twin simulations may be executing at the same time to implement a simulation of a physical system. In some embodiments, the twin runtime for a physical system may collect data from the lower levels of the architecture and links to the twin instance of the physical system. The twin runtime may render the twin instance of the physical system using the 3D models of the different physical components.

The digital twin monitor may perform XR rendering and/or hot spotting as a graphical overlay on the visual rendering of a physical system. A digital twin application may perform various functions based on data collected from the simulation (e.g., model outputs and/or results based on changes), such as anomaly detection and condition monitoring of models or the corresponding components.

Figure 6:
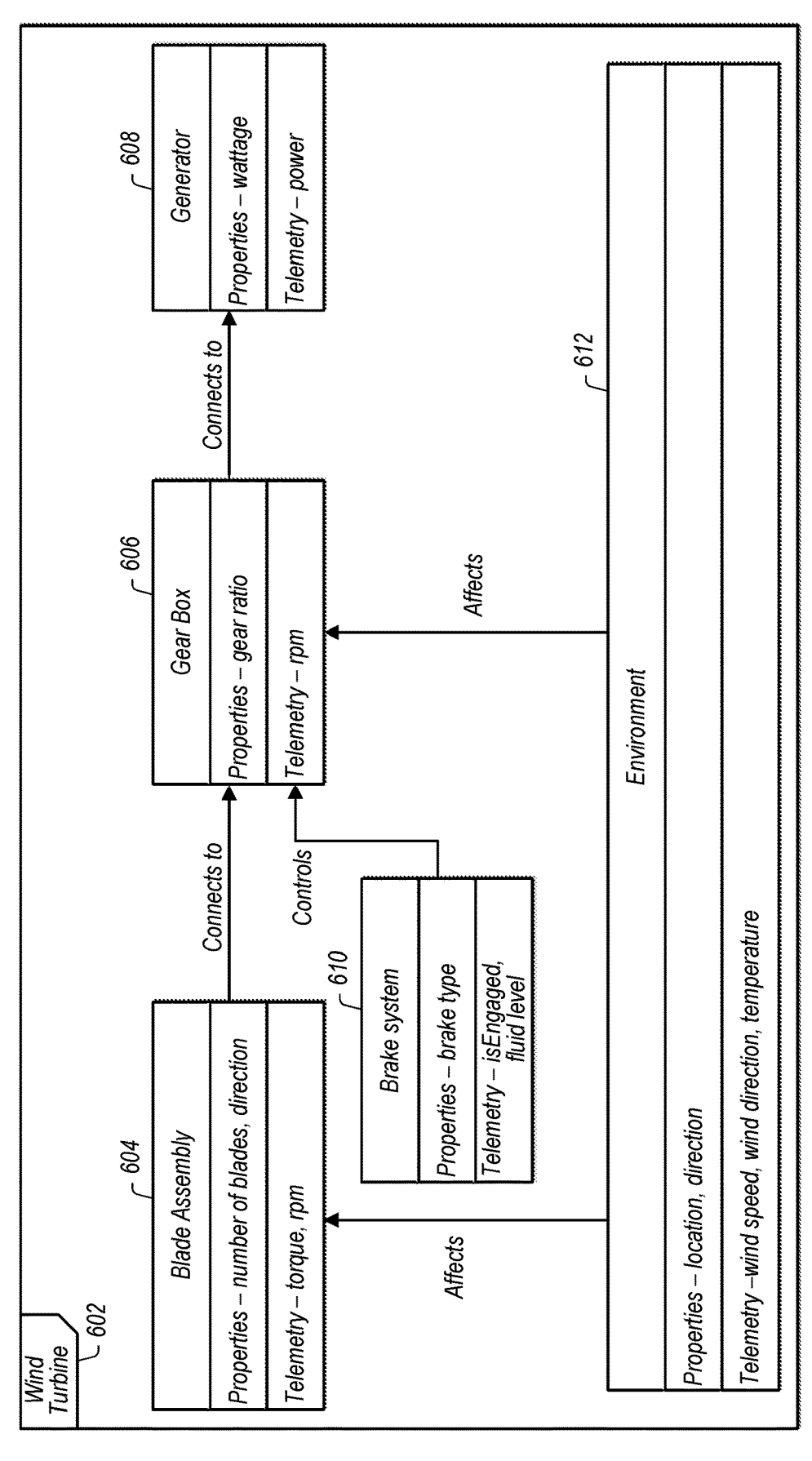
FIG. 6 is a logical block diagram illustrating a simulation of a wind turbine using digital twins of different components of the wind turbine, according to some embodiments.

FIG. 6 is a logical block diagram illustrating a simulation of a wind turbine using digital twins of different components of the wind turbine, according to some embodiments.

In embodiments, a user may want to create a digital representation (simulation) of a wind turbine 602. To do so, the user may decompose the physical turbine system into the following basic entities for a minimal representation of the wind turbine functionality: 1) physical entities like the blade assembly 604, gear box 606, generator 608, and brake 610; and 2) abstract entities like the environment 612 of the turbine. In embodiments, each of these sub-components are themselves modeled as a twin, with their own components.

In embodiments, the simulation of the wind turbine 602 may be used to optimize the power generation of the wind turbine. Therefore, the entities (model definitions and/or executing models) may only contain properties and/or telemetry that is relevant to the power output.

As shown, each of the models are executing based on properties, telemetry, and relationships defined for the model. For example, the blade assembly has the time invariant properties of "number of blades" and "direction" that the blade assembly is facing. The blade assembly also receives the time variant properties of torque and rpm (e.g., telemetry data).

Relationships are also defined for the blade assembly. For example, the telemetry data and properties of the environment affects the blade assembly (e.g., increasing wind speed causes the rpm to increase) and the blade assembly connects to the gear box (therefore, the properties and/or the telemetry data of the blade assembly may affect the gear box—e.g., increasing rpm of the blade assembly increases the rpm of the gear box).

Figure 7:
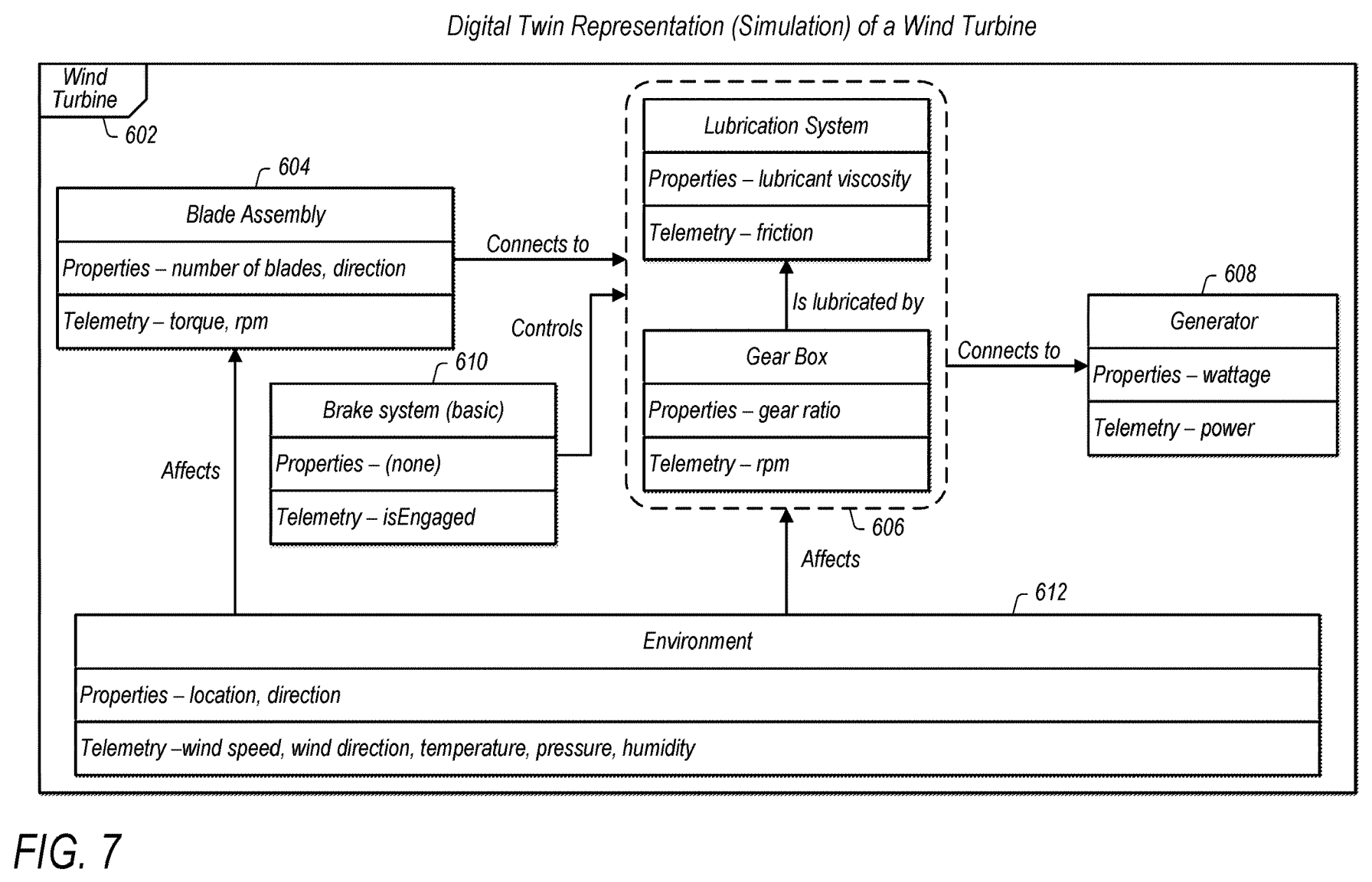

FIG. 7 is a logical block diagram illustrating a simulation of a wind turbine using digital twins of different components of the wind turbine, according to some embodiments.

In embodiments, the simulation of the wind turbine 602 may be used to study the wear and tear of the gear box to optimize the gear box life. Therefore, the gear box is further decomposed to show/simulate the lubrication system (e.g., creating a more detailed/higher fidelity version of the executing model of the gear box). The model also tracks additional environmental values, including pressure and humidity, as they are known to affect the gear life. The brake system does not monitor other telemetry data (e.g., fluid levels) that are not relevant to this use case.

In both FIGS. 6 and 7, the top level semantic model for the turbine remains the same because the turbine model has the same set of connected components in both cases; however, the fidelity of properties and composition of those components differ based on the use case. In both cases, the wind turbine interfaces to the external stimulus in the same way (converts wind energy to power).

As described herein, a user may indicate one or more changes to the simulation of FIG. 6 or 7 (new telemetry data for any of the models, model changes, etc.), and any results of these changes (increase in rpm, increased power, etc.) may be transmitted to a destination for processing. For example, a result may be analyzed and based on the analysis, a command may be generated and sent to one of the physical components to cause it to perform an action (e.g., apply or release one or more breaks of the brake system).

Figure 8:
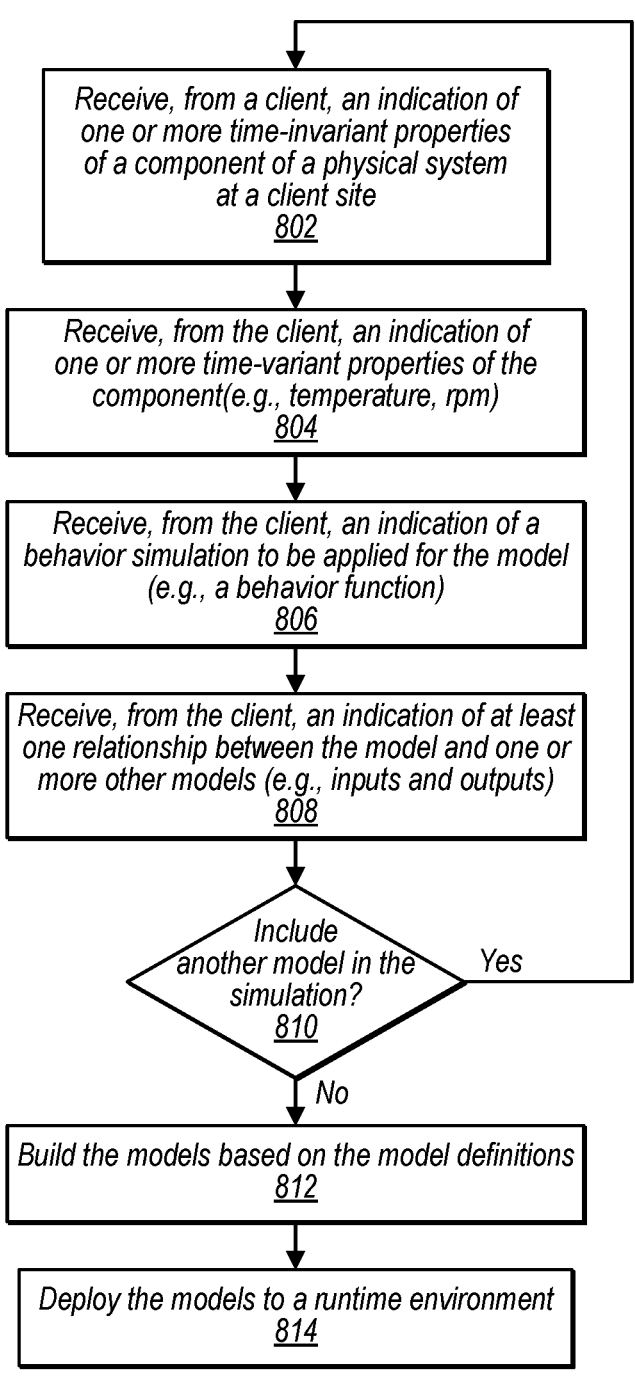
FIG. 8 is a high-level flowchart illustrating various methods and techniques to implement building and deploying models of components of a physical system, according to some embodiments.

FIG. 8 is a high-level flowchart illustrating various methods and techniques to implement building and deploying models of components of a physical system, according to some embodiments. In various embodiments, any of the functionality described for any portions of the flowcharts 8-10 may be performed by any of the components of FIGS. 1-7 and/or 11.

Figure 9:
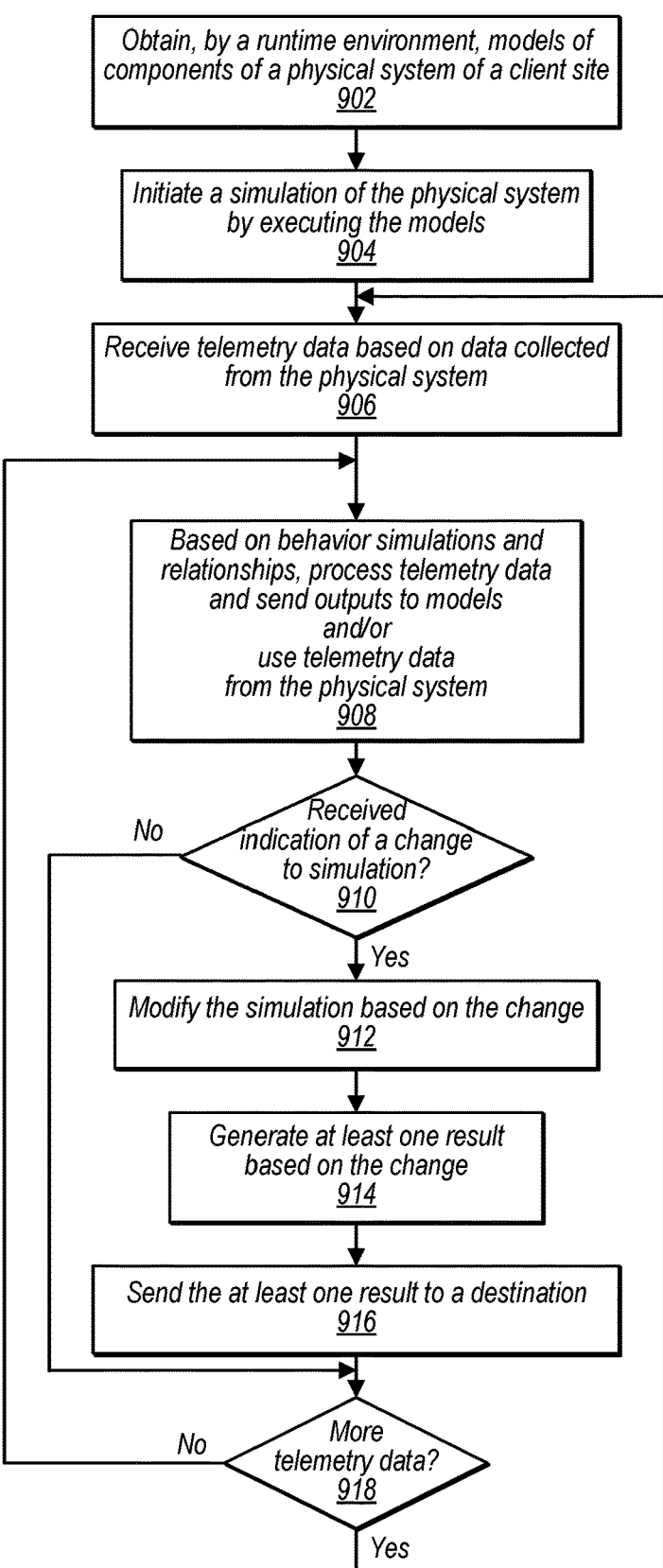
FIG. 9 is a high-level flowchart illustrating various methods and techniques to simulate behavior and changes in a physical system using models of components of the physical system, according to some embodiments.
Figure 10:
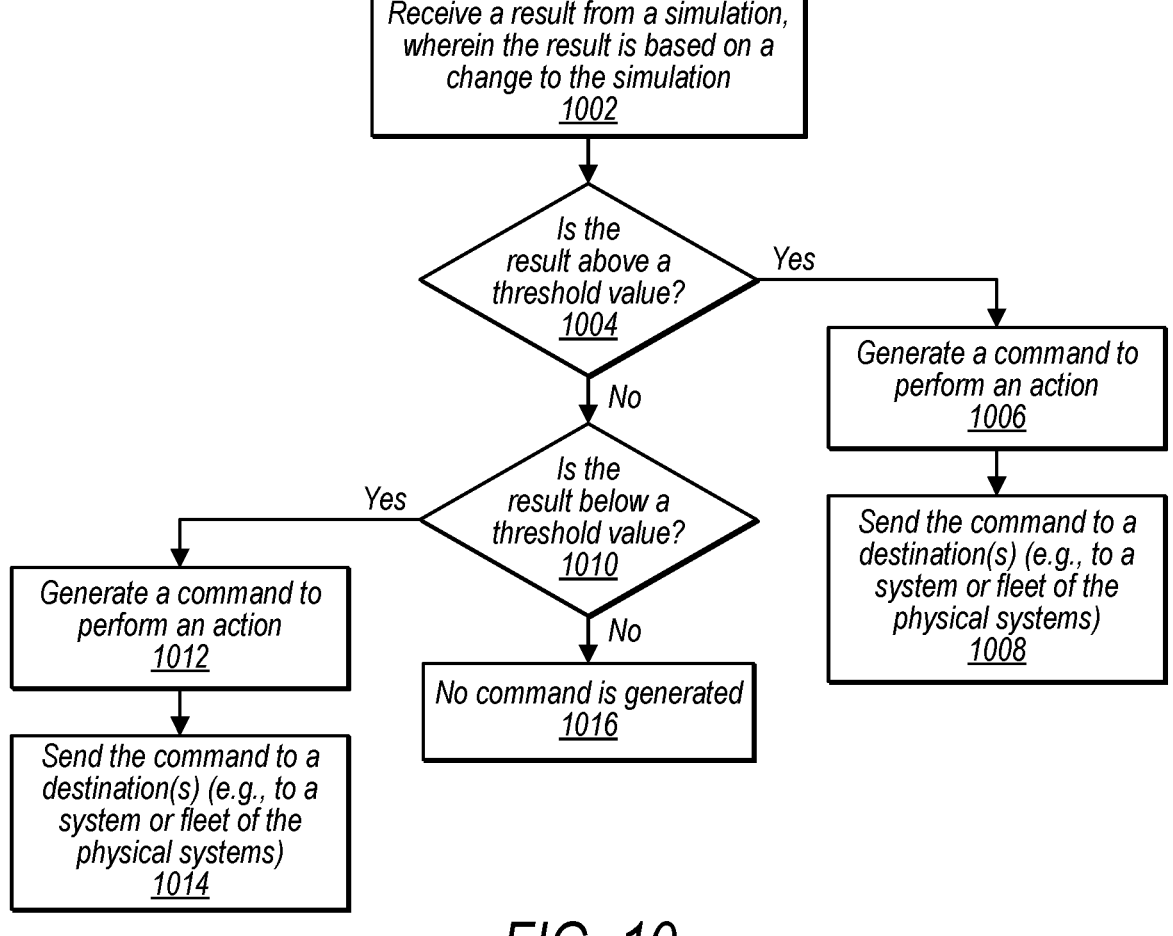
FIG. 10 is a high-level flowchart illustrating various methods and techniques to control a component of a physical system based on modifying a simulation of the physical system, according to some embodiments.

These techniques, as well as the techniques discussed with regard to FIGS. 9 and 10, may be implemented using components or systems as described above with regard to FIGS. 1-7, as well as other types of components or systems, and thus the following discussion is not intended to be limiting as to the other types of systems that may implement the described techniques. For example, the techniques may be implemented by a digital twin service of a provider network and/or a local service/application of a client network.

At block 802, a digital twin service receives, from a client, an indication of one or more time-invariant properties of a component of a physical system of a client site. At block 804, the service receives, from the client, an indication of one or more time-variant properties of the component. At block 806, the service receives, from the client, an indication of a behavior simulation to be applied for the model. At block 806, the service receives, from the client, an indication of at least one relationship between the model and one or other models (e.g., indications of any inputs from other models and/or from telemetry data sources, outputs to any other models).

At block 810, the service determines whether there is another model to be included and/or defined for the simulation (e.g., the user may indicate whether another model needs to be included and/or defined). If so, then the process returns to block 802. If not, then at block 812, the service builds the models based on the definitions for each model (e.g., provided in blocks 802-808). At block 814, the service deploys the models to a runtime environment, where they can be instantiated and/or executed to implement a simulation of a physical system of the client site.

FIG. 9 is a high-level flowchart illustrating various methods and techniques to simulate behavior and changes in a physical system using models of components of the physical system, according to some embodiments.

At block 902, a runtime environment obtains models of components of a physical system to a client site (e.g., deployed to the runtime environment). At block 904, the runtime environment initiates a simulation of the physical system by executing the models. At block 906, the runtime environment receives telemetry data based on data collected from the physical system.

At block 908, based on behavior simulations and defined relationships between the models, the models process at least a portion of the telemetry data (e.g., run a behavior simulation function) and/or use at least a portion of the telemetry data from the physical system as input (e.g., without simulating behavior). As described herein, at least some of the models may receive output data from another model and process the output data as input data (e.g., using a behavior simulation function in accordance with the simulation mode). For example, based on a defined relationship, a model may send its output to another model and the other model processes the data using a behavior simulation to generate yet another output. The other model may send the other output to an additional model for further processing, as described above. This may be repeated any number of times with any number of models. In embodiments, any given model may receive any number of inputs from one or more models and/or generate/send any number of outputs to one or more other models.

In embodiments, a model(s) may continue to receive telemetry data (e.g., detected output from a particular physical component), but will override the telemetry data using the output of another executing model (e.g., that corresponds to the particular physical component) because that model is in "simulation" mode. For example, a user may input a higher wind speed for a blade assembly (to answer a what-if question) and as a result, the higher rpm value that is output by the model for the blade assembly will override the rpm value that is collected as telemetry data from the physical system. This may allow a user to compare the current telemetry data (the actual rpm of the blade) with the output of the model (rpm due to the behavior simulation). In embodiments, the digital twin service may compare the simulation result(s) (e.g., the rpm due to the behavior simulation) to the actual instrumented telemetry data from the physical system (the actual rpm of the blade) and/or may send the actual and simulated values to the client network for display to a user. The service may perform one or more actions in response to the comparison. For example, if the simulated rpm exceeds a predetermined threshold value, then a command may be generated to cause the physical system to perform an action (e.g., change the blade angle by a certain number of degrees). If the simulated rpm does not exceed the predetermined threshold value, then another command may be generated to cause the physical system to perform another action (e.g., change the blade angle a different number of degrees and/or in the opposite direction). As mentioned herein, in some embodiments, one or more of the models may obtain telemetry data but do not process the data (e.g., in accordance with the "follow" mode), even though one or more other models may be operating in simulation mode.

At block 910, if the runtime environment receives an indication of a change to the simulation, then at block 912, the runtime environment modifies the simulation based on the change. For example, the user may provide the input data for a particular model, which overrides the default input for that particular model (e.g., telemetry data or output from another model), as part of a what-if analysis. As described herein, any other type of change may be applied (e.g., update a model, replacing a model, adding a new model). At block 914, the runtime environment generates at least one result based on the change. At block 916, the runtime environment sends the at least one result to a destination.

Returning to block 910, if the runtime environment does not receive an indication of a change, then the process advances to block 918. At block 918, if more telemetry data has been sent to the runtime environment, then the process returns to block 906, where the runtime environment receives/obtains the telemetry data. If more telemetry data has not been sent to the runtime environment, then the process returns to block 908, where the runtime environment continues to run the digital twin based on the previously received telemetry data and the executing models.

FIG. 10 is a high-level flowchart illustrating various methods and techniques to control a component of a physical system based on modifying a simulation of the physical system, according to some embodiments.

At block 1002, a digital twin service receives a result from a simulation, wherein the result is based on a change to the simulation (e.g., an updated rpm of a blade assembly of a wind turbine). At block 1004, the service determines whether the result is above a threshold value (e.g., 30 rpm). If the result is above the threshold value, then at block 1006, the service generates a command to perform an action (e.g., apply break for 5 seconds). At block 1008, the service sends the command to a destination (e.g., a component of the physical system (e.g., a breaking system)). In some embodiments, the command may be sent to a fleet of any number of physical systems to configure/control the physical systems.

Returning to block 1004, if the result is not above the threshold value, then at block 1010, the service determines whether the result is below a threshold value (e.g., 20 rpm). If the result is below the threshold value, then at block 1012, the service generates a command to perform an action (e.g., release break). At block 1014, the service sends the command to a destination (e.g., a component of the physical system (e.g., a breaking system)). In embodiments, the command may be sent to a fleet of any number of physical systems to configure/control the physical systems. Returning to block 1010, if the result is not below the threshold value, then no command is generated or sent. In embodiments, any other type of analysis may be applied to any results that are received from a simulation, in order to generate and send any number of different commands for any number of physical components of a physical system.

Figure 11:
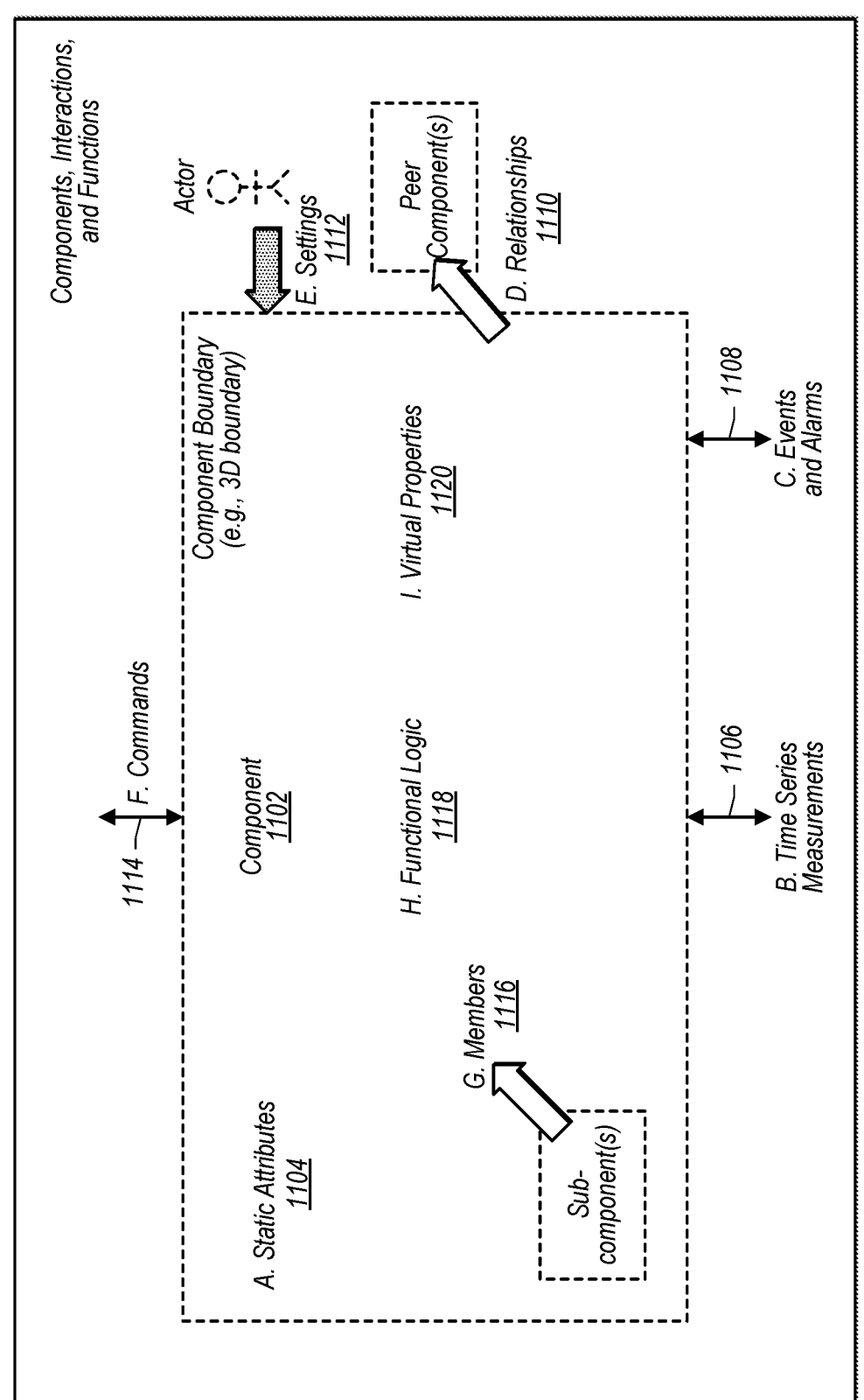
FIG. 11 is a logical block diagram illustrating a component of a system, a component boundary, and various entities associated with the component, according to some embodiments.

FIG. 11 is a logical block diagram illustrating a component of a system, a component boundary, and various entities associated with the component, according to some embodiments.

In some embodiments, a digital twin is a digital representation of a system (e.g., a physical system or process flow or logical system) that may be used for different purposes. In embodiments, a modeling language provides a set of constructs with associated schemas for describing interoperable and reusable models of systems (or components) that may be used for various cases. In various embodiments, a digital twin service may define digital twin models using modeling language and may use the digital twin models to provide different types of services (e.g., visualization, anomaly detection).

In some embodiments, digital twin modeling may differ from traditional modeling that may be used for information modeling of a system. Traditional models may be unable to faithfully follow a physical system during its full life-cycle and may be unable to provide a true representation of a physical system or process. Using techniques described herein, a digital twin may represent a high fidelity, true digital representation of a physical system or process. In embodiments, such a digital twin (e.g., executing instance of a digital twin model), when substituted for a system (e.g., a physical system) may remain indistinguishable for a third party entity operating with the system (or operating/using the system).

In various embodiments, a digital model may be of sufficient fidelity to satisfy a substitution principle. In embodiments, according to the substitution principle, the digital twin model of a component (e.g., of a system or physical system) may capture all of the inputs and outputs at the boundary of the component and the functional logic of the component with sufficient fidelity (e.g., at least a minimum level of fidelity) that enables substitution of the original component with a digital twin instance created/executed using the digital twin model. In embodiments, such substitution remains indistinguishable by any third-party entity interacting with that component.

In embodiments, the developer of a digital twin model may use the substitution principle to discover the system and/or component interactions and functions to a sufficient/required level of fidelity to meet the need of a use case. In various embodiments, interactions and/or functions that do not participate or affect the outcome of the use case and/or interactions that cannot be measured through instrumentation may be eliminated (in order to simplify the model). In some embodiments, a digital twin model of a system created using the above principles (e.g., substation) is a super set model and any other type of model may be derived and/or extracted from the digital twin model (e.g., the super set model).

In some embodiments, a technique to build high fidelity digital twin models for components and systems of components (e.g., digital twin models of sufficient fidelity to meet a use case) may include: 1) a client (e.g., developer) decomposes a system and associated process into a graph of smaller components and dependent sub-processes to the required/sufficient level of detail to suffice the use case under consideration; 2) the client models each component individually by constructing an imaginary boundary (e.g., three dimensional boundary) around the component and identifies the interactions (input/outputs) at that boundary and the functional logic of the component during the full life-cycle of the component or for that duration of interest, and then represents the identified elements through the modeling constructs supported by a modeling language; 3) the client may identify additional attributes of the component (e.g., names, identifiers, location), and model them to enable identification of the digital twin of the component. The component model, upon completion, may include a collection of modeling language attributes, measurements, events and/or functional logic that may be referred to as "properties"; 4) the client identifies, for each component's properties, data sources from the physical system, metadata, and/or configurations, and associates them to the property to form the digital twin model of the component; 5) the client connects all the component models in the graph by binding the outputs of the components to the inputs of associated components, mimicking the real system to form the complete digital twin model of a system; 6) the client may represent abstract or computed properties at various levels in the graph through additional modeling language constructs.

In the depicted example of FIG. 11, a component 1102 with a three dimensional boundary and presents different interactions at the boundaries, the functional logic abstraction, the containment relationship, the association relationships and other entities which are described below.

In embodiments, static attributes 1104 (e.g., named "attributes" in the modeling language) may be a "properties" modeling language construct. The modeling language models may support modeling of attributes that are read only either at the model level or at the instance level. Time series measurements 1106 (e.g., named "measurements") may also be a "properties" modeling language construct. The modeling language models may model interactions at the boundaries as a time series data and may supports both input and output.

Events 1108 (e.g., named "events") may be an "events" modeling language construct. The modeling language models may support modeling signals at the boundaries (due to mechanical, electrical, chemical etc.) through events. Events are published or consumed when the value changes and the change in value is enumerable. Alarms (e.g., named "alarms") may be an "events" modeling language construct. Alarms behave like events and carry additional information (e.g., state, severity).

Relationships 1110 (e.g., named "aggregation") may be a "relations" modeling language construct. An aggregation relationship enables sharing of components between multiple whole components (parents). In embodiments, an "association" (e.g., named "association") may also be a "relations" modeling language construct. The modeling language may allow weaker forms of relationships that indicate usage, interactions, etc. This type of relationship may be implicitly created between producers and consumers.

Settings 1112 (e.g., named "properties") may be a "properties" modeling language construct. The modeling language expresses user-driven configuration settings of a component through properties (e.g., using a writable attribute for a digital twin model of the component). Commands 1114 (e.g., named "commands") may be a "commands" modeling language construct. Commands may be closely related to events, but they may carry request data and response output data, and may be used in programmatic constructs. Commands are shown FIG. 11 as bi-directional to indicate that one component can command another component.

Members 1116 (e.g., named "composition") may be a "components" modeling language construct. The composition relation shows a strict whole and a part. Unlike aggregation, the part is not shared with other components and may not remain independently in the context. Functional logic 1118 (e.g., named "functional logic") may be a "functions" modeling language construct. The modeling language may express the logic of a component through a set of one or more functions. A model designer may specify a list of functions to capture the logic of the component and can also specify the inputs/outputs to the functions using the inputs/outputs to the component. Functions may have access to attributes and static properties.

In embodiments, virtual properties 1120 may not exist in a component of a system and therefore may not be discovered through the substitution principle. However, virtual properties may provide valuable insights on an actual system or process. A transformation property may be a virtual property that modifies one or more streaming properties through a simple formula or aggregates them through filter and/or aggregation functions. An aggregate property may be a virtual property that enables metrics aggregation for a single property within a time window using one or more aggregation functions for measured/received values of the property (e.g., minimum, maximum, average, latest, etc.).

In embodiments, machine learning is another type of virtual property that may enable learning the behavior of a set of properties over time for the purpose of anomaly detection and to perform various predictions based on collected data. An alarms property may be a type of virtual property that captures alarms that are raised by a digital twin. Hotspots are another virtual property that may be used. Digital twins may present/render the virtual properties on certain locations called the hotspots on a graphical representation of a digital twin of a system. In a physical system, measured properties may be represented using display units, lights, meters, audible alarms etc. A digital twin may also have use for such entities; however, providing such units may confuse the user as they may not be not present in the physical system and the correspondence between the digital twin and the physical system is lost. Digital twins may use certain locations (hotspots) on the twin that displays virtual properties based on the user interactions at that location.

FIG. 12 is a high-level flowchart illustrating various methods and techniques to build high fidelity digital twin models for components and systems of components, according to some embodiments.

At block 1202, a digital twin service receives, from a client, an indication of components of a system that are to be modeled by the digital twin service. At block 1204, the service receives, from the client, identification of interactions for a component; a given interaction is an input or an output at a boundary of the component.

At block 1206, the service receives, from the client, identification of events for the component (e.g., signals at the boundary). At block 1208, the service receives, from the client, identification of data sources at the system for the identified interactions and events. At block 1210, the service receives, from the client, a definition of behavior of the component based on function logic. At block 1212, the service builds a digital twin model of the component based on the interactions, events, data sources, and behavior.

At block 1214, the service determines whether to build another digital twin model. For example, the service may determine, based on client input, whether the client wishes to define/build another model or not. If so, then the process returns to block 1204. If not, then at block 1216, the service receives, from the client, indications to bind outputs of digital twin models to inputs of other digital twin models. At block 1218, the service binds the outputs to the inputs based on the received indications. At block 1220, the service builds a digital twin model of the system based on the digital twin models of the components and the binded outputs and inputs.

In embodiments, one or more of the digital twin models of a particular component is of sufficient fidelity such that substitution of the particular component with an executing instance of the particular digital twin model results in functionality of the instance that is indistinguishable, by the other components or by a third party entity, from functionality of the particular component. In various embodiments, one or more of the digital twin models of a particular component is of sufficient fidelity such that the particular component, if substituted with the executing instance of the particular digital twin model, would not change functionality of the system or would result in a change in the functionality that is indistinguishable by a third party entity that operates the system. In some embodiments, the digital twin models are of sufficient fidelity such that substitution of the system with the executing instance of the digital twin model of the system results in functionality of the instance of the digital twin model of the system that is indistinguishable from functionality of the system with respect to a third party entity operating with the physical system.

In some embodiments, for each (or some) of the built digital twin models, the digital twin service receive, from the client, an indication to bind one or more outputs of the digital twin model to one or more inputs of at least another of the digital twin models. In response to the indication(s) to bind, the service may bind the one or more outputs of each of the digital twin models to the one or more inputs of the other digital twin models. After all outputs and inputs are binded for all of the components, the service than builds a digital twin model of the system based at least on the digital twin models of the components, the binded outputs, and the binded inputs. In embodiments, the service may then cause execution of the instance of the digital twin model of the system (to execute the digital twin model of the system, the digital twin models of the components are executed as respective instances). As described herein, the service may send the built digital twin model of the system to a computer service/execution environment where it is executed. In some embodiments, digital twin service itself may execute the digital twin model of the system in an execution environment.

In embodiments, when a client wishes to build a digital twin model of a system, the service receives, from the client, an indication of a plurality of components of a system that are to be modeled by the digital twin service (e.g., via input using a graphical user interface that displays the components). For each (or some) of the components of the system, the service may receive, from the client 1) identification of interactions for the component (any number of inputs and/or an outputs at a boundary of the component); 2) identification of one or more events for the component (a given event may be a signal at the boundary of the component, such as data/measurements from an environmental sensor); 3) identification of data sources at the system for the respective interactions and the respective events (e.g., identification of the sensors that will provide inputs, outputs, signals); and/or 4) a definition of behavior of the component based on functional logic (e.g., identification of one or more behavior functions). The service then builds the model based at least on the interactions, the one or more events, the data sources, and the behavior.

In embodiments, to receive the definition of behavior of a component, the service may receive, from the client, function code that defines the behavior to be applied during execution of the digital twin model of the component, wherein the function code processes data from the data sources as the input and generates the output based on the processing. In some embodiments, to receive the definition of behavior of a component, the service may receive, from the client, a selection of at least one predefined function from among a plurality of predefined functions that defines the behavior to be applied during execution of the digital twin model of the component, wherein the function code processes data from the data sources as the input and generates the output based on the processing.

In some embodiments, to receive, from the client, an indication of the components of a system that are to be modeled by the digital twin service, the service displays a graphical representation of the system (including each component). The service then receive, from the client, a selection of each of the components in order to decompose the system into components that are to be modeled individually.

In various embodiments, to receive identification of an event, the service receives an identification of one or more signals generated by one or more sensors based on detection of environmental conditions or physical conditions of the component. In some embodiments, the service receives, from the client, input indicating one or more attributes of a component. The attributes may include a unique identifier of the component or a location of the component with respect to at least another of the components. The building of the model may also be based on any number of attributes provided by the client (e.g., a user/administrator of the client). In embodiments, receiving a definition of behavior of a component may include receiving an indication of a particular period of time (or a full life-cycle of the component) for which the definition of behavior of the component applies.

Since high fidelity models may be created using the techniques described herein, in some embodiments, an executing instance of a component may replace a component, allowing the system to continue operating as if the original component were still functioning. For example, during execution of a digital twin model of a system, the service may receive, from a client, identification of one of the executing instances of digital twin models of the components and/or one of the components of the system to be substituted with the identified instance. The service may then substitute the identified component of the system with the identified instance, wherein the identified instance processes one or more outputs from one or more of the components of the system to generate one or more of its own outputs and transmits the generated one or more outputs to one or more additional components of the system. In embodiments, the substitution of the identified component of the system with the identified instance does not change functionality of the system or results in a change in the functionality of the system that is indistinguishable by a third party entity operating the physical system (e.g., a human operator or a process/program that is operating or interacting with the physical system).

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may implement the functionality described herein (e.g., the functionality of the digital twin service, compute service, models, and any other components that implement the techniques described herein). The various methods as illustrated in the figures and described herein represent example embodiments of methods. The order of any method may be changed, and various elements may be added, reordered, combined, omitted, modified, etc.

Figure 13:
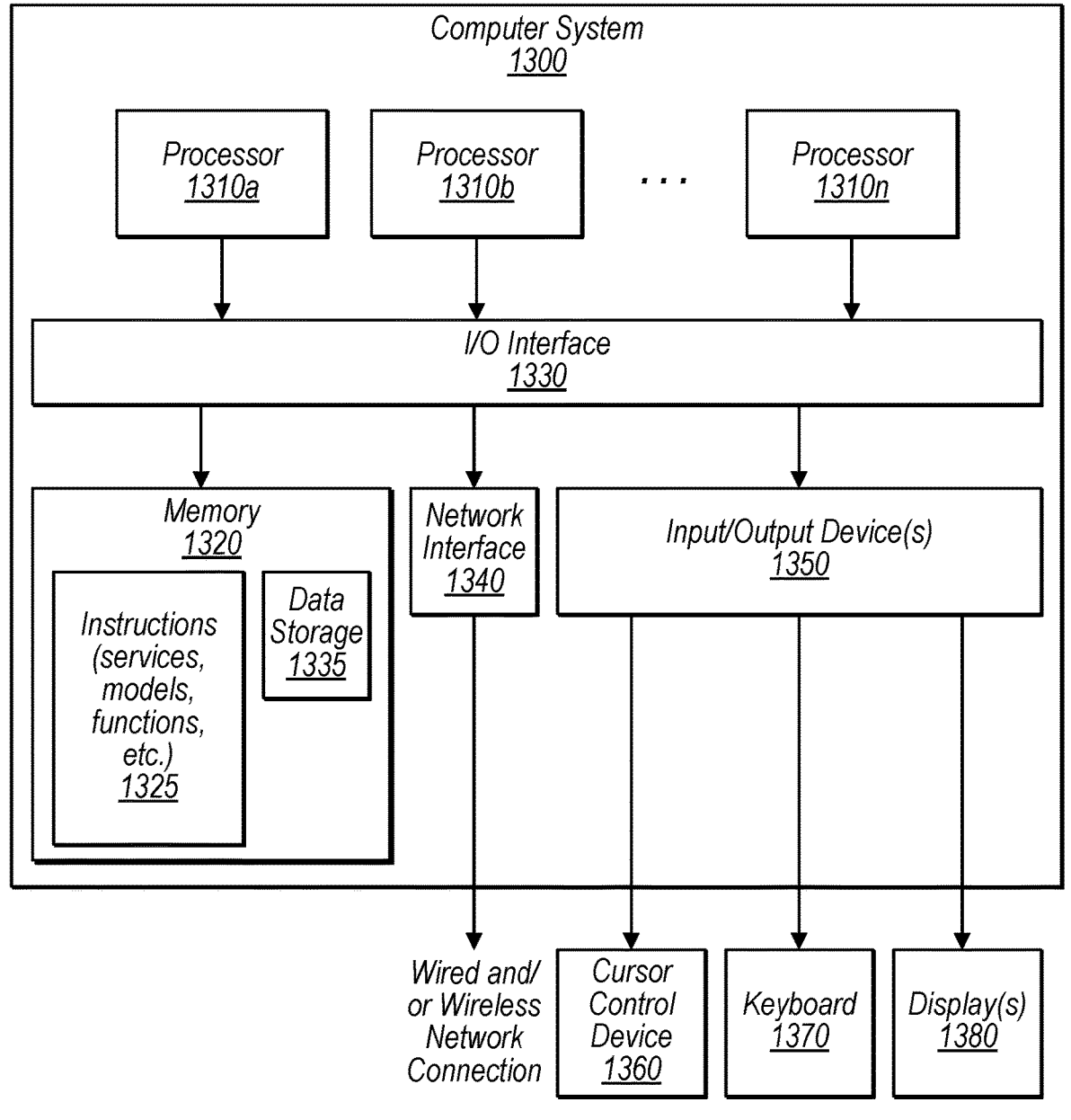
FIG. 13 is a block diagram illustrating an example computing system, according to some embodiments.

Embodiments to implement modelling, building, and managing digital twins of systems through ingestion of real time data streams into behavior simulation of system components and/or to implement building high fidelity digital twin models for components and systems of components as described herein may be executed on one or more computer systems, which may interact with various other systems or devices. One such computer system is illustrated by FIG. 13. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. Display(s) may include standard computer monitor(s) and/or other display systems, technologies or devices, in one embodiment. In some embodiments, it is contemplated that embodiments may be implemented using a single instance of computer system 1300, while in other embodiments multiple such systems, or multiple nodes making up computer system 1300, may host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions, in one embodiment. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

In some embodiments, at least one processor 1310 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1320 may store program instructions 1325 and/or data accessible by processor 1310, in one embodiment. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the digital twin service, compute service, models, and any other components, etc.) are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. A computer-accessible medium may include non-transitory storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340, in one embodiment.

In one embodiment, I/O interface 1330 may be coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor 1310.

Network interface 1340 may allow data to be exchanged between computer system 1300 and other devices attached to a network, such as other computer systems, or between nodes of computer system 1300, in one embodiment. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or retrieving data by one or more computer system 1300, in one embodiment. Multiple input/output devices 1350 may be present in computer system 1300 or may be distributed on various nodes of computer system 1300, in one embodiment. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325 that implement the various embodiments of the systems as described herein, and data store 1335, comprising various data accessible by program instructions 1325, in one embodiment. In one embodiment, program instructions 1325 may include software elements of embodiments as described herein and as illustrated in the Figures. Data storage 1335 may include data that may be used in embodiments (e.g., models, functions, telemetry data, etc.). In other embodiments, other or different software elements and data may be included.

Those skilled in the art will appreciate that computer system 1300 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1300 may be transmitted to computer system 1300 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

one or more processors and one or more memories, wherein the one or more memories have stored thereon instructions, which when executed by the one or more processors, cause the one or more processors to implement a digital twin service for a plurality of clients of a provider network, wherein the digital twin service is configured to, for a client of the plurality of clients:

receive, from a management device of the client, user input that comprises a definition of a model of a component of a physical system of a remote site of the client, wherein the definition indicates at least:

one or more time-invariant properties of the component of the physical system;

one or more time-variant properties of the component;

a behavior simulation to be applied for the model; and at least one relationship between the model and one or more other models of other components of the physical system; and deploy the model and the one or more other models to a runtime environment; and one or more other processors and one or more other memories, wherein the one or more other memories have stored thereon instructions, which when executed by the one or more other processors, cause the one or more other processors to implement the runtime environment, wherein the runtime environment is configured to:

initiate a simulation of the physical system as a digital twin instance based at least on execution of the model as an executing model of the simulation and execution of the one or more other models as one or more other executing models of the simulation;

receive telemetry data from the remote site of the client, wherein the telemetry data is based on data collected from the physical system of the remote site of the client at different times, and wherein the telemetry data from the remote site of the client comprises a series of values for at least one of the time-variant properties of the component of the physical system;

based on the behavior simulation for the model, process at least a portion of the telemetry data received from the remote site of the client by the executing model of the simulation to generate an output;

based on the at least one relationship between the model and another model of the one or more other models of other components of the physical system that was previously indicated by the user input, send the output of the executing model of the simulation, that simulates the component of the physical system using the telemetry data received from the remote site, to another executing model of the simulation that simulates one of the other components of the physical system;

based on another behavior simulation for the other model, process the output of the executing model by the other executing model to generate another output;

during the execution of the model of the component of the physical system, modify the simulation based on at least one change indicated by additional input from a user, wherein the additional input comprises user-provided telemetry data for a particular time-variant property of the component of the physical system, to be processed by the same executing model that previously processed telemetry data for the particular time-variant property of the component of the physical system received from the remote site of the client;

generate at least one result based on the modification to the simulation; and provide the at least one result to a destination.

2. The system as recited in claim 1, the runtime environment is further configured to:

receive additional telemetry data based on other user input; and process the additional telemetry data by at least the executing model of the simulation to generate another result.

3. The system as recited in claim 1, the runtime environment is further configured to:

receive additional telemetry data based on other user input; and based on the behavior simulation for the model, process the additional telemetry data by the executing model of the simulation to generate an additional output;

based on the at least one relationship between the model and the other model, send the additional output to the other executing model; and based on the other behavior simulation for the other model, process the additional output of the executing model by the other executing model to generate the at least one result.

4. The system as recited in claim 1, wherein the runtime environment is further configured to:

receive other user input indicating a new model;

execute the new model;

receive additional telemetry data, wherein the additional telemetry data is based on additional data collected from the physical system, and wherein the additional telemetry data comprises a series of values for one or more time-variant properties of the new model; and based on a behavior simulation for the new model, process the additional telemetry data by the new model of the simulation to generate the at least one result.

5. The system as recited in claim 1, wherein the digital twin service is further configured to:

receive, from the client, a selection of one of the other definitions of the other models from among a plurality of model definitions of a library;

receive, from the client, information to customize the other definition of the other model, wherein the information comprises at least an indication of one or more of:

another behavior simulation to be applied for the other model; and at least one relationship between the other model and the model or between the other model and another of the one or more other models; and deploy the customized model to the runtime environment.

6. A method, comprising:

performing, by one or more computing devices of a provider network:

receiving, from a management device of a client, user input that comprises an indication of a definition of a model of a component of a physical system at a remote site of a client, wherein the definition of the model indicates at least:

one or more time-variant properties of the component of the physical system;

a behavior simulation to be applied for the model; and at least one relationship between the model and one or more other models of other components of the physical system;

initiating a simulation of the physical system at least by executing the model as an executing model of the simulation and executing the one or more other models as one or more other executing models of the simulation;

receiving telemetry data from the remote site, wherein the telemetry data is based on data collected from the physical system of the remote site, and wherein the telemetry data comprises a series of values for at least one of the time-variant properties of the component of the physical system;

based on the behavior simulation for the model, processing at least a portion of the telemetry data from the remote site by the executing model to generate an output;

based on the at least one relationship between the model and another model of the one or more other models of other components of the physical system that was previously indicated by the user input, sending the output of the executing model of the simulation, that simulates the component of the physical system using the telemetry data received from the remote site, to another executing model of the simulation that simulates one of the other components of the physical system;

based on another behavior simulation for the other model, processing the output of the executing model by the other executing model to generate another output; and during the execution of the model of the component of the physical system, modifying the simulation based on at least one change indicated by additional input from a user, wherein the additional input comprises user-provided telemetry data for a particular time-variant property of the component of the physical system, to be processed by the same executing model that previously processed telemetry data for the particular time-variant property of the component of the physical system received from the remote site of the client.

7. The method as recited in claim 6, further comprising:

generating at least one result based on the modification to the simulation; and providing the at least one result to a destination.

8. The method as recited in claim 7, further comprising:

based on the behavior simulation for the model, processing additional telemetry data by the executing model of the simulation to generate an additional output;

based on the at least one relationship between the model and the other model, sending the additional output to the other executing model; and based on the other behavior simulation for the other model, processing the additional output of the executing model by the other executing model to generate at least one result.

9. The method as recited in claim 8, further comprising:

analyzing the at least one result at the destination;

based on the analysis, generating one or more commands to cause at least one of the components of the physical system to perform an action; and sending the one or more commands to the one or more components of the physical system.

10. The method as recited in claim 9, wherein analyzing the at least one result at the destination comprises:

determining that the value of the at least one result exceeds a predetermined threshold value.

11. The method as recited in claim 6, wherein initiating the simulation of the physical system comprises:

generating a 2D or 3D visualization of the physical system based at least on the definition of the model and the other definitions of the one or more other models, wherein at least a portion of the telemetry data is overlaid onto the visualization; and sending the visualization to a remote network of the client.

12. The method as recited in claim 6, wherein at least one function, when executed, provides the behavior simulation, and wherein the receiving, from the client, the indication of the definition of the model comprises:

receiving, from the client, a selection of the at least one function to provide the behavior simulation, wherein the function accepts one or more input streams and provides one or more output streams according to a predefined schema, or receiving, from the client, function code that defines the behavior simulation to be applied for the model, wherein the function code processes one or more input streams and provides one or more output streams based on the processing.

13. The method as recited in claim 6, further comprising:

receiving, from a user, an indication of a new model to replace the model;

terminating execution of the model;

executing the new model;

receiving additional telemetry data, wherein the additional telemetry data is based on additional data collected from the physical system, and wherein the additional telemetry data comprises a series of values for one or more time-variant properties of the new model; and based on a behavior simulation for the new model, processing the additional telemetry data by the new model of the simulation to generate the at least one result.

14. The method as recited in claim 6, wherein the definition of the model indicates one or more sources at the remote site of the client that are to provide values for the one or more time-variant properties of the component of the physical system.

15. One or more non-transitory computer-accessible storage media storing program instructions that when executed on or across one or more processors cause the one or more processors to:

obtain a plurality of models of components of a physical system of a remote site, wherein individual ones of the models are based on user input that comprises at least an indication of:

one or more time-variant properties of the component of the physical system;

a behavior simulation to be applied for the model; and at least one relationship between the model and one or more other models of the plurality of models;

initiate a simulation of the physical system at least by executing a model of the plurality of models as an executing model of the simulation and by executing one or more other models of the plurality of models as one or more other executing models of the simulation;

receive telemetry data from the remote site, wherein the telemetry data is based on data collected from the physical system of the remote site, and wherein the telemetry data comprises a series of values for at least one of the time-variant properties of a component of the physical system indicated by the user input for the model;

based on the behavior simulation for the model, process at least a portion of the telemetry data from the remote site by the executing model to generate an output;

based on the at least one relationship between the model and another model of the one or more other models that was previously indicated by the user input, send the output of the executing model of the simulation, that simulates the component of the physical system to the other model of the simulation using the telemetry data received from the remote site, to another executing model of the simulation that simulates one of the other components of the physical system;

based on another behavior simulation for the other model, process the output of the executing model by the other executing model to generate another output; and during the execution of the model of the component of the physical system, modify the simulation based on at least one change indicated by additional input from a user, wherein the additional input comprises user-provided telemetry data for a particular time-variant property of the component of the physical system, to be processed by the same executing model that previously processed telemetry data for the particular time-variant property of the component of the physical system received from the remote site of the client.

16. The one or more storage media as recited in claim 15, wherein the program instructions when executed on or across the one or more processors further cause the one or more processors to:

generate at least one result based on the modification to the simulation; and provide the at least one result to a destination.

17. The one or more storage media as recited in claim 16, wherein the program instructions when executed on or across the one or more processors further cause the one or more processors to:

based on the behavior simulation for the model, process additional telemetry data by the executing model of the simulation to generate an additional output;

based on the at least one relationship between the model and the other model, send the additional output to the other executing model; and based on the other behavior simulation for the other model, process the additional output of the executing model by the other executing model to generate at least one result.

18. The one or more storage media as recited in claim 16, wherein the program instructions when executed on or across the one or more processors further cause the one or more processors to:

execute a new model;

receive additional telemetry data, wherein the additional telemetry data is based on additional data collected from the physical system, and wherein the additional telemetry data comprises a series of values for one or more time-variant properties of the new model; and based on a behavior simulation for the new model, process the additional telemetry data by at least the new model of the simulation to generate the at least one result.

19. The one or more storage media as recited in claim 16, wherein the program instructions when executed on or across the one or more processors further cause the one or more processors to:

replace the model with a new model;

terminate execution of the model;

execute the new model;

receive additional telemetry data, wherein the additional telemetry data is based on additional data collected from the physical system, and wherein the additional telemetry data comprises a series of values for one or more time-variant properties of the new model; and based on a behavior simulation for the new model, process the additional telemetry data by at least the new model of the simulation to generate at least one result.

20. The one or more storage media as recited in claim 15, wherein the program instructions when executed on or across the one or more processors further cause the one or more processors to:

replace the model with a new model;

terminate execution of the model;

execute the new model;

receive additional telemetry data, wherein the additional telemetry data is based on additional data collected from the physical system, and wherein the additional telemetry data comprises a series of values for one or more time-variant properties of the new model; and based on a behavior simulation for the new model, process the additional telemetry data by the new model to generate an additional output;

based on a relationship between the new model and the other model, send the additional output to the other executing model; and based on the other behavior simulation for the other executing model, process the additional output by the other executing model to generate at least one result.

* * * * *